(12) United States Patent
Kouzaki et al.

(10) Patent No.: US 7,983,507 B2
(45) Date of Patent: Jul. 19, 2011

(54) IMAGE FO MING DEVICE AND IMAGE FORMING METHOD

(75) Inventors: Masahiro Kouzaki, Toyohashi (JP); Tetsuya Sakai, Aichi-ken (JP); Kazuomi Sakatani, Toyokawa (JP); Soh Hirota, Aichi-ken (JP); Takashi Harashima, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1064 days.

(21) Appl. No.: 11/806,406

(22) Filed: May 31, 2007

(65) Prior Publication Data
US 2007/0279695 A1    Dec. 6, 2007

(30) Foreign Application Priority Data

Jun. 5, 2006 (JP) ................... 2006-156449

(51) Int. Cl.
*G06K 9/40* (2006.01)
*G06K 15/00* (2006.01)
(52) U.S. Cl. ...................... 382/274; 358/3.06
(58) Field of Classification Search .............. 382/274, 382/312, 254, 266; 358/3.01, 3.03, 3.06, 358/1.9
See application file for complete search history.

(56) References Cited

U.S. PATENT DOCUMENTS

| 5,995,248 A | 11/1999 | Katori et al. |
| 6,891,641 B1 | 5/2005 | Kouzaki |
| 2003/0206308 A1* | 11/2003 | Matsuya ............ 358/1.9 |
| 2007/0206227 A1* | 9/2007 | Inoue et al. ........ 358/3.2 |

FOREIGN PATENT DOCUMENTS

| JP | 6-60181 | 3/1994 |
| JP | 9-261490 | 10/1997 |
| JP | 11-218974 | 8/1999 |
| JP | 11-284850 | 10/1999 |
| JP | 11-314401 | 11/1999 |
| JP | 2001-103328 | 4/2001 |
| JP | 2003-287930 | 10/2003 |
| JP | 2004-333837 | 11/2004 |

OTHER PUBLICATIONS

Translation of Japanese Notification of Reasons for Refusal mailed May 13, 2008, directed to counterpart JP application No. 2006-156449; 7 pages.

* cited by examiner

*Primary Examiner* — Yon Couso
(74) *Attorney, Agent, or Firm* — Morrison & Foerster LLP

(57) ABSTRACT

An image forming device for forming an image on an image carrier using a different grayscale reproduction method for each of two or more different attributes contained in portions of the image. The image forming device forms a different standard pattern in one-to-one correspondence with each different attribute contained in the image portions, using a grayscale reproduction method used for reproducing image portions containing the attribute, detects density of each standard pattern formed by the standard pattern forming unit, sets, for each different attribute, a condition for correcting grayscale of the image portions containing the attribute, in accordance with the detected density, and corrects grayscale of the image portions in accordance with each condition set by the correction condition setting unit.

13 Claims, 12 Drawing Sheets

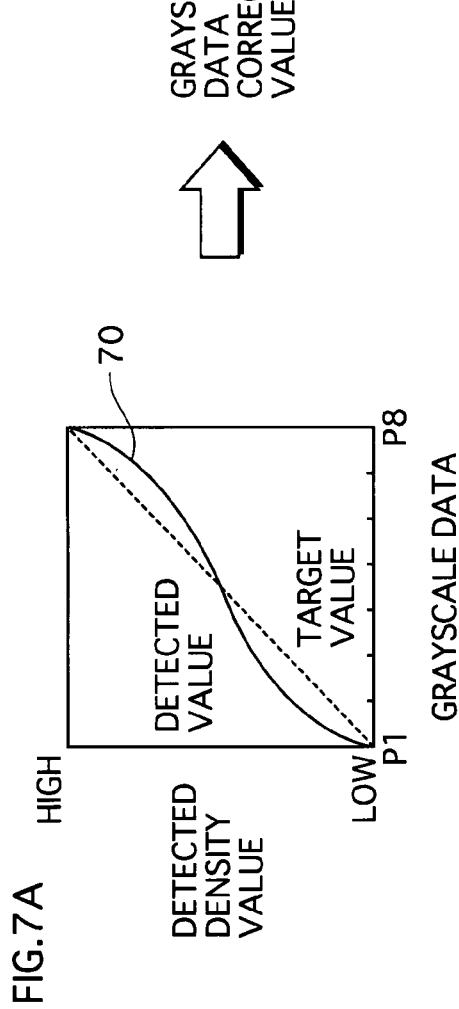
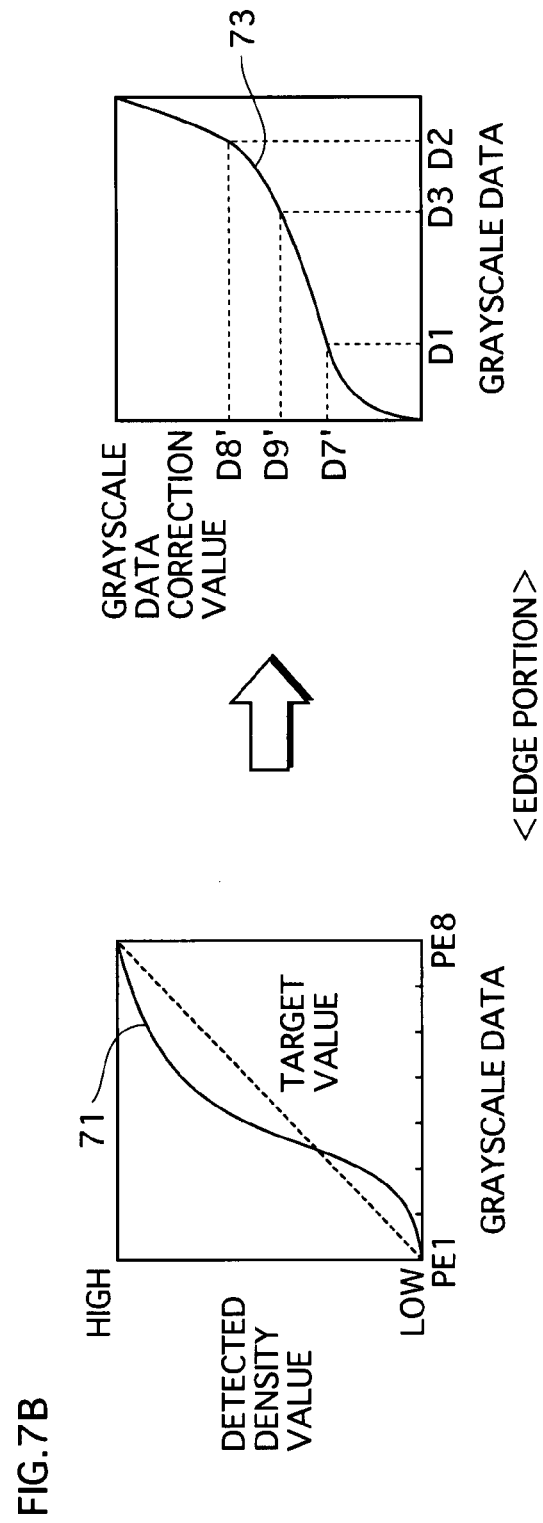
FIG.7A
FIG.7B

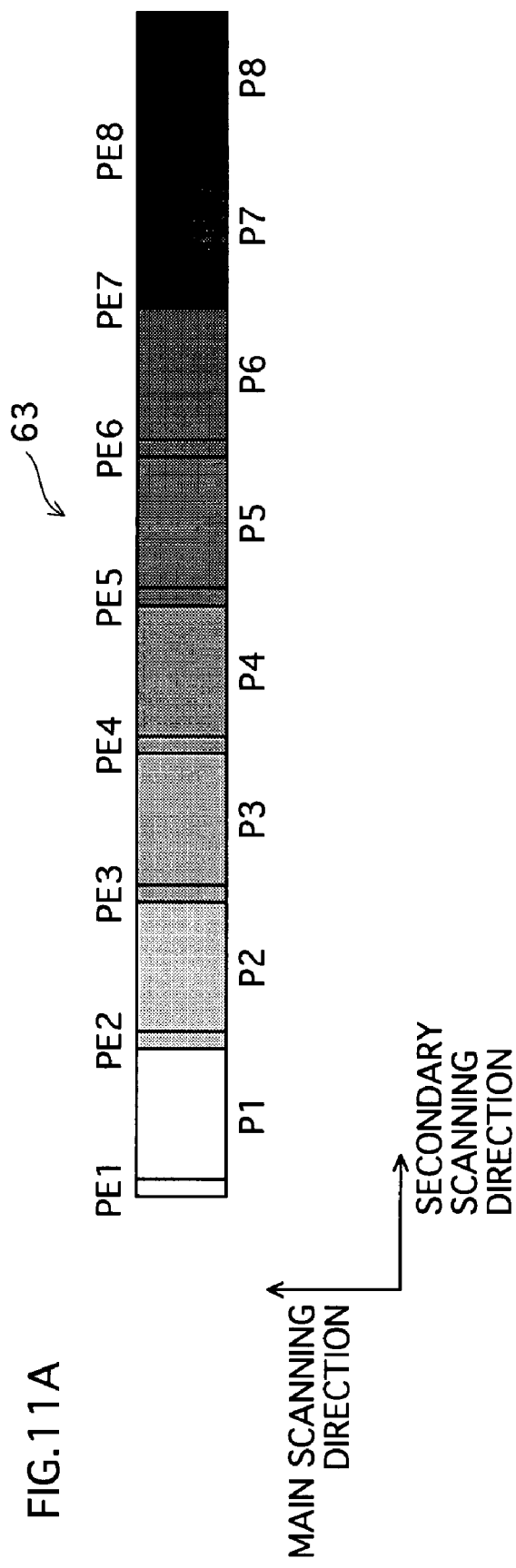

IMAGE FORMING DEVICE AND IMAGE FORMING METHOD

This application is based on application No. 2006-156449 filed in Japan, the contents of which are hereby incorporated by reference.

BACKGROUND OF THE INVENTION (1) Field of the Invention

The present invention relates to an image forming device and an image forming method for reproducing an image using a different grayscale reproduction method for each different attribute of portions of the image, and especially to an improvement in a technology for improving the image reproducibility.

(2) Description of the Related Art

Image forming devices such as digital copiers use various grayscale reproduction methods for improving grayscale reproducibility of images.

As one example, Japanese Patent Application Publication No. 11-284850 (Patent Document 1) discloses a technology that clarifies edge portions, which are often included in character images, using the 1-pixel-cycle Pulse Width Modulation (PWM) control in which the amount of exposure is modulated for each pixel, and smoothes halftone portions (non-edge portions), which are often included in photograph images, using the 2-pixel-cycle PWM control in which the amount of exposure is modulated for each unit area composed of two pixels.

In addition to such grayscale reproduction methods, grayscale correction methods such as what is called $\gamma$ correction are known as the technology for improving the grayscale reproducibility.

Here, the $\gamma$ correction is a technology for correcting the grayscale so that the grayscale of the original document image (input image) is reproduced accurately in the output image. The following describes this technology in more detail. Although in the ideal, the grayscale of the input image should be in direct proportion to the grayscale of the output image, they are not in direct proportion to each other in the actuality due to some factors such as the photosensitive characteristics of the photosensitive drum, the change in the surrounding environment and the like. The relationship between the grayscale of the input image and the grayscale of the output image is therefore represented by a curve that is shifted from a straight line representing the direct proportion. The $\gamma$ correction technology addresses the problem by first obtaining, as a $\gamma$ curve, a curve that represents a reversed characteristics of the shifted curve, and then correcting the grayscale level using the obtained $\gamma$ curve so that the shift of the curve from the originally expected straight line can be eliminated.

A typical method for obtaining the $\gamma$ curve is to actually form a plurality of test patches having different density levels, on the image carrier, detect the density of each of the formed test patches, and obtain from the detection results a difference from the grayscale of the input image.

However, in Patent Document 1, different grayscale correction methods are used respectively for the edge portions and the non-edge portions. Accordingly, if the same $\gamma$ correction is applied to both the edge and non-edge portions using the same $\gamma$ curve, the grayscale reproducibility may be improved with respect to the non-edge portions, but may be worsened with respect to the edge portions due to the difference from the non-edge portions in the output characteristics or the like, for example.

Such a problem is not limited to the edge and non-edge portions, but may occur similarly in such image forming apparatuses that use a different grayscale correction method for each attribute of images, such attributes of images including photograph and character.

SUMMARY OF THE INVENTION

The object of the present invention is therefore to provide an image forming device and an image forming method that further improve the grayscale reproducibility.

The above object is fulfilled by an image forming device for forming an image on an image carrier using a different grayscale reproduction method for each of two or more different attributes contained in portions of the image, the image forming device comprising: a standard pattern forming unit operable to form a different standard pattern in one-to-one correspondence with each different attribute contained in the image portions, using a grayscale reproduction method used for reproducing image portions containing the attribute; a detecting unit operable to detect density of each standard pattern formed by the standard pattern forming unit; a correction condition setting unit operable to set, for each different attribute, a condition for correcting grayscale of the image portions containing the attribute, in accordance with the density detected by the detecting unit; and a grayscale correcting unit operable to correct grayscale of the image portions in accordance with each condition set by the correction condition setting unit.

With the above-stated construction, the setting of a correction condition is performed for each different attribute of image portions in accordance with the output characteristics of the actual image formation. This makes it possible to improve the grayscale reproducibility in the formed image.

In the above-described image forming device, attributes contained in the image portions may include an edge and a non-edge, and the standard pattern forming unit forms, as a standard pattern, an edge pattern in accordance with a grayscale reproduction method that is used for reproducing edge portions of the image, and forms, as a standard pattern, a non-edge pattern in accordance with a grayscale reproduction method that is used for reproducing non-edge portions of the image.

With the above-stated construction, it is possible to improve the grayscale reproducibility in both the edge portions and non-edge portions.

In the above-described image forming device, the non-edge pattern may include a plurality of first patches, the plurality of first patches have different grayscale levels and each first patch has a first area size, the edge pattern includes a plurality of second patches, and the plurality of second patches have different grayscale levels and each second patch has a second area size that is smaller than the first area size.

With the above-stated construction, it is possible to set a correction condition that is closer to the actual output characteristics, with respect to, for example, the edge portions. This makes it possible to further improve the grayscale reproducibility.

In the above-described image forming device, the standard pattern forming unit may form the first patches and the second patches on the image carrier to be arranged in sequence such that respective patches of the first patches and the second patches are alternately adjacent to each other.

With the above-stated construction, it is possible to form the second patches constituting a standard pattern so as to have substantially the same output characteristics as the edge portions of the actually formed image. This makes it possible to set correction conditions so as to be closer to the actual output characteristics, especially when an image, in which edges are drawn on a halftone background, is formed. This makes it possible to further improve the grayscale reproducibility.

In the above-described image forming device, the standard pattern forming unit may form the first patches and the second patches such that in a direction in which the first patches and the second patches are arranged, grayscale of patches in each sequence of the first patches and the second patches becomes gradually higher from one end to another end of the sequence.

In the above-described image forming device, the standard pattern forming unit may form the first patches and the second patches such that in a direction in which the first patches and the second patches are arranged, grayscale of patches in a sequence of the first patches becomes gradually higher from one end to another end of the sequence, grayscale of patches in a sequence of the second patches becomes gradually lower from one end to another end of the sequence.

In the above-described image forming device, the standard pattern forming unit may form the first patches and the second patches such that all of the first patches have a same grayscale level, and in a direction in which the first patches and the second patches are arranged, grayscale of patches in a sequence of the second patches becomes gradually higher from one end to another end of the sequence.

In the above-described image forming device, the standard pattern forming unit may form the first patches and the second patches such that all of the second patches have a same grayscale level, and in a direction in which the first patches and the second patches are arranged, grayscale of patches in a sequence of the first patches becomes gradually higher from one end to another end of the sequence.

The above-described image forming device may further comprise a developing unit operable to develop a static latent image formed on the image carrier, and a width "de" of the second patches in a secondary scanning direction is either smaller than a distance "Ds" between the image carrier and the developing unit or smaller than a length of a developing area in the secondary scanning direction, wherein the developing area is an area in which during a developing process a developing agent can transfer between the image carrier and the developing unit at a developing position where the image carrier and the developing unit face each other.

In the above-described image forming device, the width "de" of the second patches in the secondary scanning direction may be smaller than 2 [mm].

In the above-described image forming device, the width "de" of the second patches in the secondary scanning direction may be smaller than a width "d" of the first patches in the secondary scanning direction.

In the above-described image forming device, the width "de" of the second patches in the secondary scanning direction may be smaller than a maximum width in the secondary scanning direction of an image area that is reproduced by the grayscale reproduction method used for reproducing the edge portions.

With the above-stated constructions, it is possible to form the second patches constituting a standard pattern so as to have substantially the same output characteristics as the edge portions of the actually formed image. This makes it possible to set correction conditions so as to be closer to the actual output characteristics. This makes it possible to further improve the grayscale reproducibility.

The above-described object is also fulfilled by an image forming method for an image forming device that forms an image on an image carrier using a different grayscale reproduction method for each of two or more different attributes contained in portions of the image, the image forming method comprising: a standard pattern forming step for forming a different standard pattern in one-to-one correspondence with each different attribute contained in the image portions, using a grayscale reproduction method used for reproducing image portions containing the attribute; a detecting step for detecting density of each standard pattern formed in the standard pattern forming step; a correction condition setting step for setting, for each different attribute, a condition for correcting grayscale of the image portions containing the attribute, in accordance with the density detected in the detecting step; and a grayscale correcting step for correcting grayscale of the image portions in accordance with each condition set in the correction condition setting step.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 7A shows an example of the non-edge γ curve;

FIG. 7B shows an example of the edge γ curve;

FIGS. 11A and 11B show the construction of the standard patterns in the second embodiment;

DESCRIPTION OF THE PREFERRED EMBODIMENT

The following describes embodiments of the image forming device and image forming method of the present invention, taking a tandem color digital printer (hereinafter, merely referred to as a printer) as an example.

First Embodiment

Figure 1:
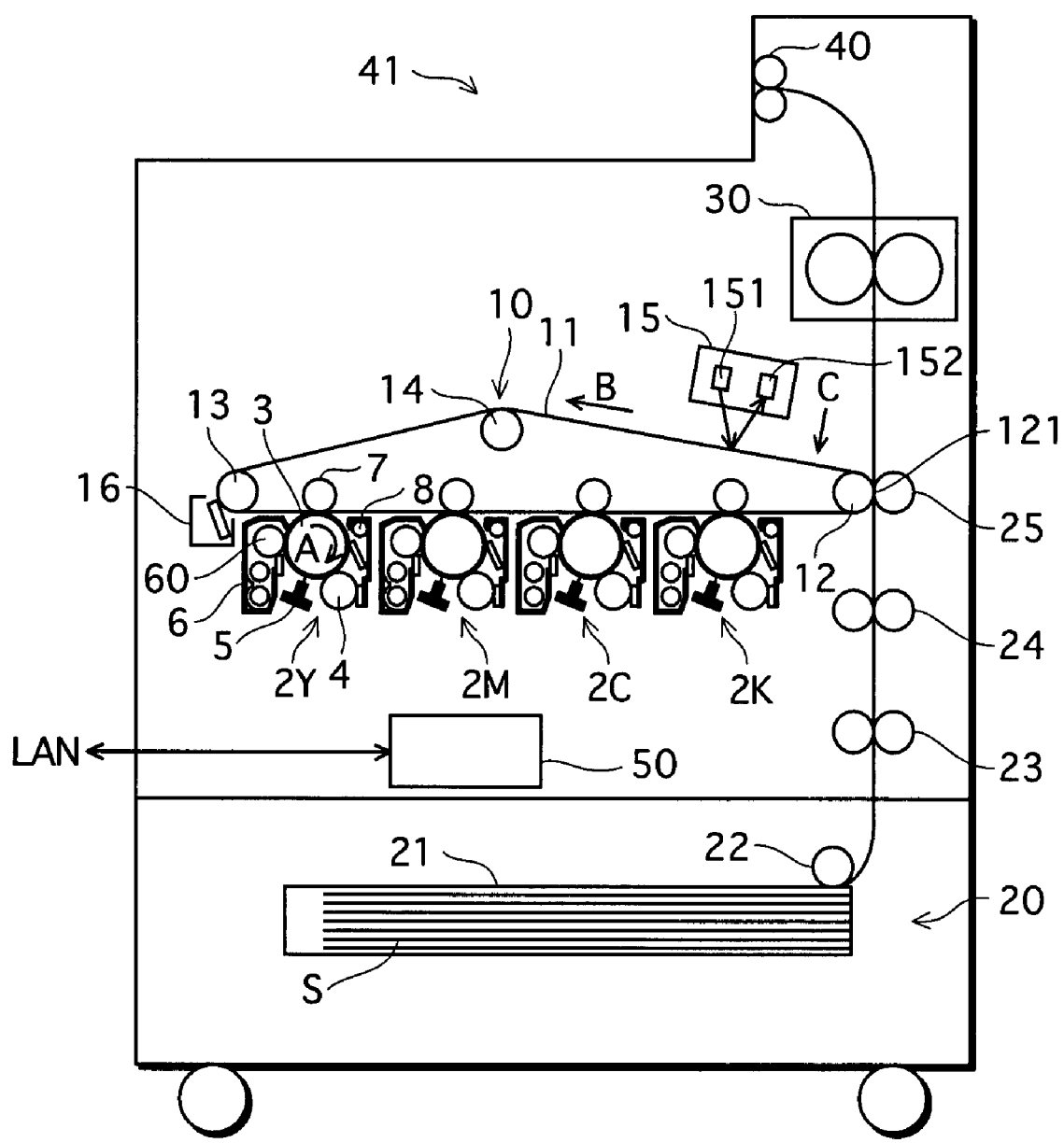
FIG. 1 shows an overall construction of the printer in the first embodiment.

FIG. 1 shows an overall construction of a printer 1 in the first embodiment. As shown in FIG. 1, the printer 1 includes an image processing unit 10, a feeding unit 20, a fixing unit 30, and a control unit 50. Upon receiving an instruction to execute a print job from an external terminal device (not illustrated) via a network (in this example, a LAN) to which the printer 1 is connected, the printer 1 executes the print job according to the received instruction.

The image processing unit 10 includes image creating units 2Y, 2M, 2C, and 2K corresponding respectively to colors of yellow (Y), magenta (M), cyan (C), and black (K), an intermediate transfer belt 11, and a toner pattern detecting sensor 15.

The image creating units 2Y includes a photosensitive drum 3 that is driven to rotate in the direction indicated by the arrow A shown in FIG. 1, a charge roller 4, an exposing unit 5, a developing unit 6, an initial transfer roller 7, and a drum cleaning unit 8. The construction of the image creating unit 2Y similarly applies to the other image creating units 2M-2K, and in FIG. 1, reference signs of the components of the image creating units 2M-2K are omitted.

The intermediate transfer belt 11 is suspended with tension between a drive roller 12, a passive roller 13, and a tension roller 14, and is driven to rotate in the direction indicated by the arrow B shown in FIG. 1.

The feeding unit 20 includes a paper feed cassette 21 for storing sheets S, a pickup roller 22 for picking up the sheets S from the paper feed cassette 21 one by one, a pair of transport rollers 23 for transporting the picked-up sheet S, a pair of timing rollers 24 for taking a timing for transporting the sheet S onto a secondary transfer position 121, and a secondary transfer roller 25.

The control unit 50 receives an image signal from an external terminal apparatus, converts the received image signal into digital image signals respectively for the colors Y-K, and controls the image processing unit 10, the feeding unit 20 and the like to perform a print operation.

More specifically, in each of the image creating units 2Y, 2M, 2C, and 2K, the charge roller 4 causes the surface of the photosensitive drum 3, which rotates in the arrow A direction, to be uniformly charged, the exposing unit 5 exposes the charged surface of the photosensitive drum 3 to form a static latent image, and the developing unit 6 develops the formed static latent image using toners as the developing agent to form a toner image. The developed toner images of each color are transferred from the photosensitive drum 3 to the surface of the intermediate transfer belt 11 by the electrostatic action of each initial transfer roller 7, which is referred to as an initial transfer. In this initial transfer, the toner images of each color are transferred at shifted timings so that they are layered on the intermediate transfer belt 11 at the same position.

As the intermediate transfer belt 11 rotates, the toner images of each color on the intermediate transfer belt 11 is moved to a secondary transfer position 121.

On the other hand, at a timing corresponding to the timing for moving the toner images of each color on the intermediate transfer belt 11, the feeding unit 20 feeds the sheet S via the pair of timing rollers 24, and the sheet S is transported while it is sandwiched by the rotating intermediate transfer belt 11 and secondary transfer roller 25. Then at the secondary transfer position 121, the toner images of each color are transferred from the intermediate transfer belt 11 to the sheet S by the electrostatic action, which is referred to as a second transfer.

The sheet S having passed the secondary transfer position 121 is transported to the fixing unit 30. The fixing unit 30 fixes the toner image onto the sheet S by heating and pressing. The sheet S with the fixed image is then ejected onto a tray 41 via a pair of eject rollers 40.

The toner pattern detecting sensor 15 is a known reflection-type optical sensor and includes a light-emitting element 151 and a light-receiving element 152. As will be described later, a non-edge pattern 61 and an edge pattern 62 (see FIGS. 5A and 6) are formed on the intermediate transfer belt 11 as standard patterns. After the standard patterns are formed, the light-emitting element 151 emits light toward the standard patterns, and the light-receiving element 152 receives the light reflected from the standard patterns, and converts the received light into an electric signal in accordance with the amount of received light. The converted signal is sent to the control unit 50 as a signal indicating the density of the standard patterns.

Figure 2:
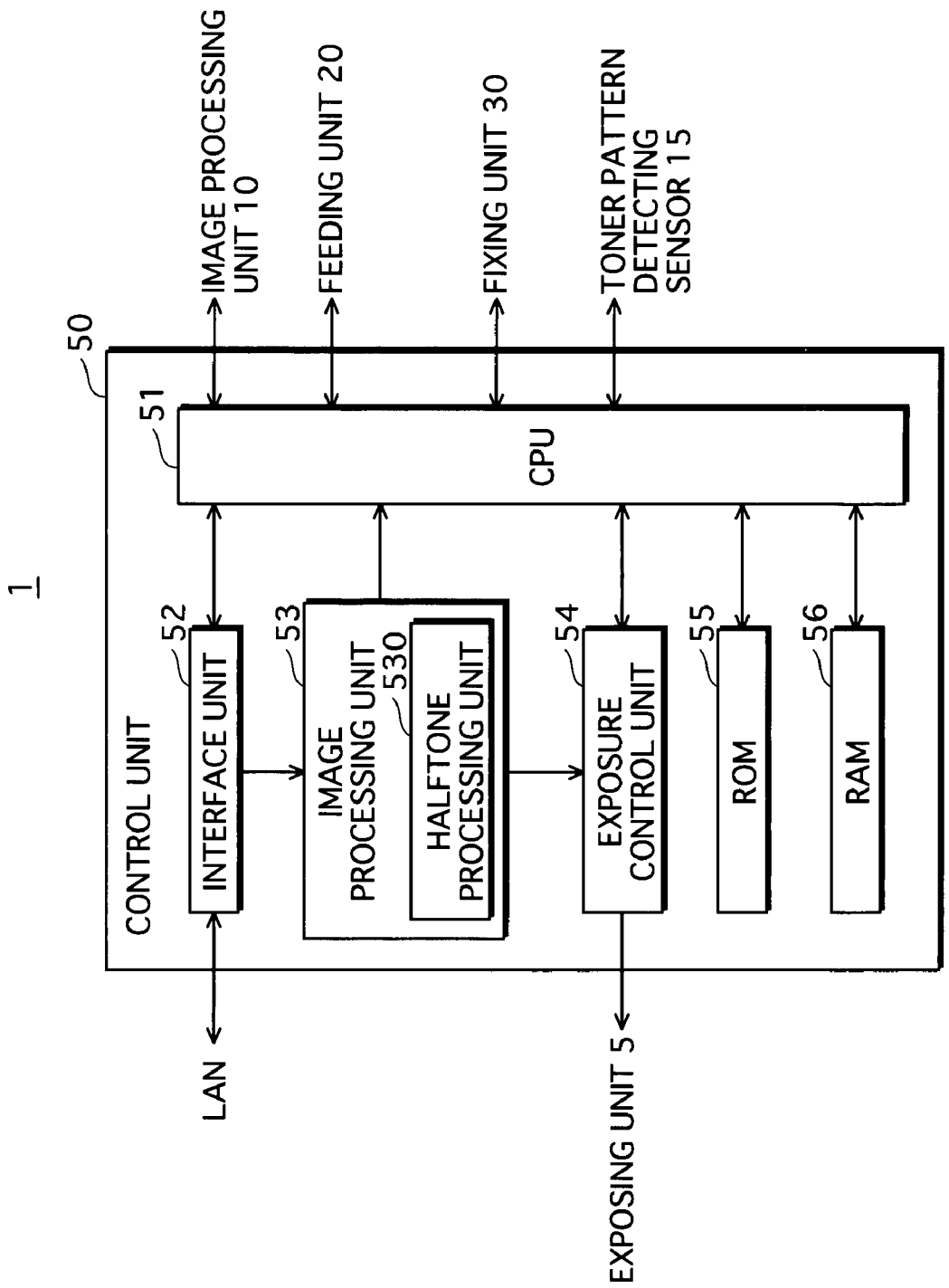
FIG. 2 shows the construction of the control unit of the printer.

FIG. 2 shows the construction of the control unit 50.

As shown in FIG. 2, the control unit 50 includes, as main components, a CPU 51, a communication interface unit 52, an image processing unit 53, an exposure control unit 54, a ROM 55, and a RAM 56.

The communication interface unit 52 is an interface achieved in a LAN card, a LAN board or the like and is used to connect with a LAN.

The image processing unit 53 receives an image signal from an external terminal device via the communication interface unit 52, converts the received image signal into digital image signals for the colors Y to K by subjecting the received image signal into the known processes of black generation, color correction, MTF, smoothing and the like. The image processing unit 53 sends the converted digital image signals to the exposure control unit 54. In this process, a halftone processing unit 530 performs grayscale correction, which will be described later, and the like.

The exposure control unit 54 controls the amount of exposure performed by an exposing unit 5, based on the digital image signals.

The ROM 55 stores a control program for the printing operation performed by the image processing unit 10, the feeding unit 20 and the like, and a program for forming the standard patterns.

The CPU 51 reads a necessary program from the ROM 55, and controls the image processing unit 10 and the like for a smooth printing operation such that they operate at appropriate timings in a unified manner.

The CPU 51 further, at a predetermined timing such as when the device is powered on, forms the standard patterns on the intermediate transfer belt 11, and performs a control to generate the γ curve that is used for a grayscale correction, from the detected density of the formed standard patterns.

The RAM 56 is used as a work area when the CPU 51 executes a program.

Figure 3:
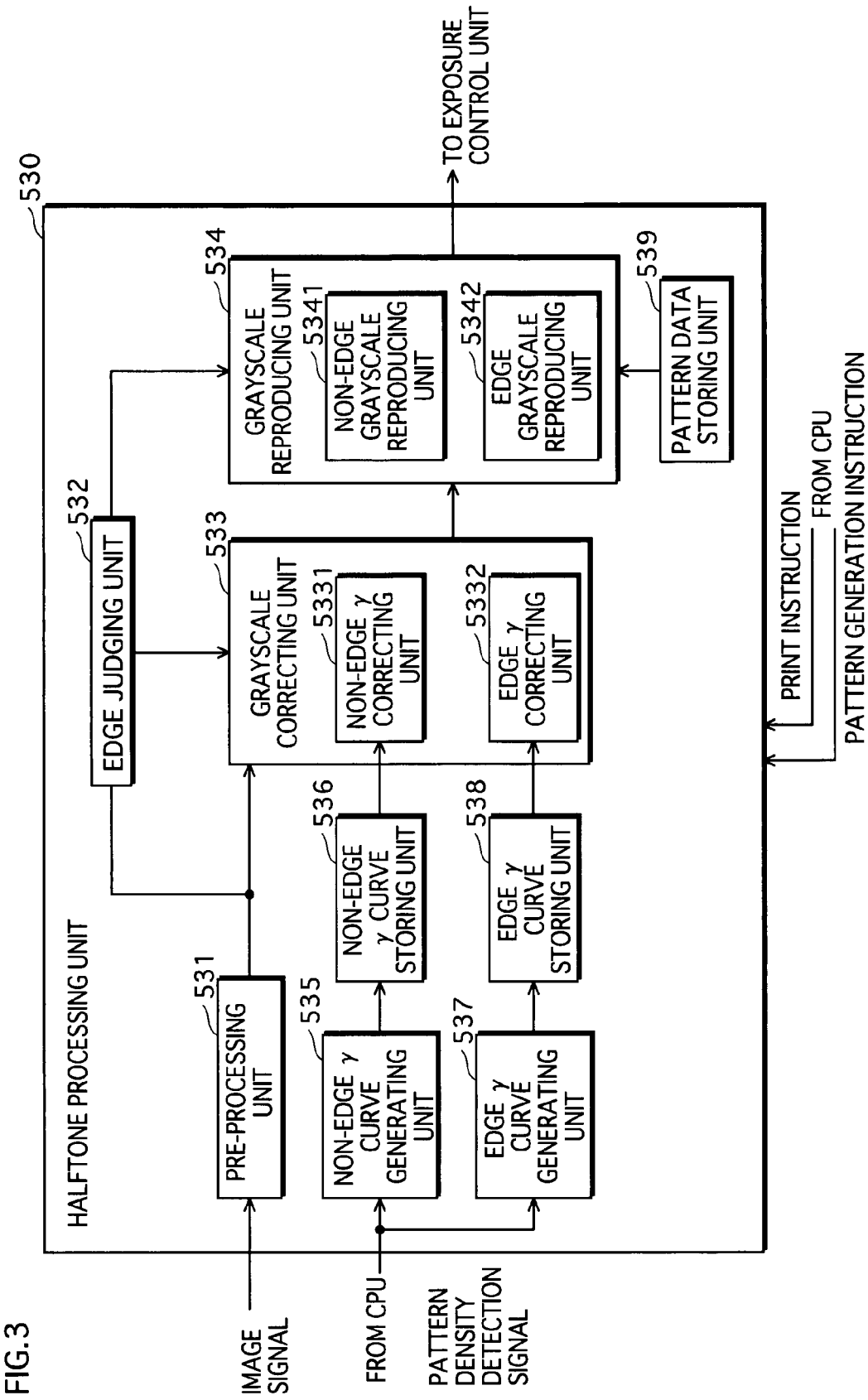
FIG. 3 shows the construction of the halftone processing unit of the control unit.

FIG. 3 shows the construction of the halftone processing unit 530.

As shown in FIG. 3, the halftone processing unit 530 includes, as main components, a pre-processing unit 531, an edge judging unit 532, a grayscale correcting unit 533, a grayscale reproducing unit 534, a non-edge γ curve generating unit 535, a non-edge γ curve storing unit 536, an edge γ curve generating unit 537, an edge γ curve storing unit 538, and a pattern data storing unit 539.

The pre-processing unit 531, when a printing is performed, receives the digital image signals for the colors Y-K that have been subjected into the processes of black generation, color correction and the like, and sends grayscale data in sequence to the edge judging unit 532 and the grayscale correcting unit 533, where the grayscale data indicates grayscale levels (in this example, 256 levels of grayscale are available) of each pixel contained in the digital image signals.

The edge judging unit 532 judges, for each pixel, whether or not the pixel belongs to an edge portion (hereinafter, such a pixel is referred to as "edge pixel"), and sends the judgment result to the grayscale correcting unit 533 and the grayscale reproducing unit 534. The edge judging method for use in the edge judging unit 532 may be a known method such as the one in which a target pixel and the peripheral pixels are put into a differential filter to obtain a quadratic differential, and the size of the obtained quadratic differential is used in the judgment on whether or not a pixel is an edge pixel.

The grayscale correcting unit 533 includes a non-edge γ correcting unit 5331 and an edge γ correcting unit 5332.

The non-edge γ correcting unit 5331 reads out non-edge γ curves (see a curve 72 shown in FIG. 7A) for each color from the non-edge γ curve storing unit 536 storing them, and performs, for each color and using the read-out non-edge γ curves, a γ correction onto the grayscale data of non-edge pixels, which are pixels that were not judged to be edge pixels, among the pixels sent from the pre-processing unit 531.

Similarly, the edge γ correcting unit 5332 reads out edge γ curves (see a curve 73 shown in FIG. 7B) for each color from the edge γ curve storing unit 538 storing them, and performs, for each color and using the read-out edge γ curves, a γ correction onto the grayscale data of edge pixels. The grayscale correcting unit 533 sends to the grayscale reproducing unit 534 the grayscale data of each pixel having been corrected by the γ correction.

The grayscale reproducing unit 534 includes a non-edge grayscale reproducing unit 5341 and an edge grayscale reproducing unit 5342.

The non-edge grayscale reproducing unit 5341 converts, for each color, the grayscale data of non-edge portions after the γ correction, into a format in which the data can be reproduced by the dither method.

More specifically, a certain number of non-edge pixels not having been judged as edge pixels are divided into blocks which are each composed of, for example, 256 non-edge pixels (vertical 16 pixels times horizontal 16 pixels). Then a predetermined dither matrix is applied to each block to determine, for each pixel in each block, whether or not the pixel is to be exposed.

Figure 4A:
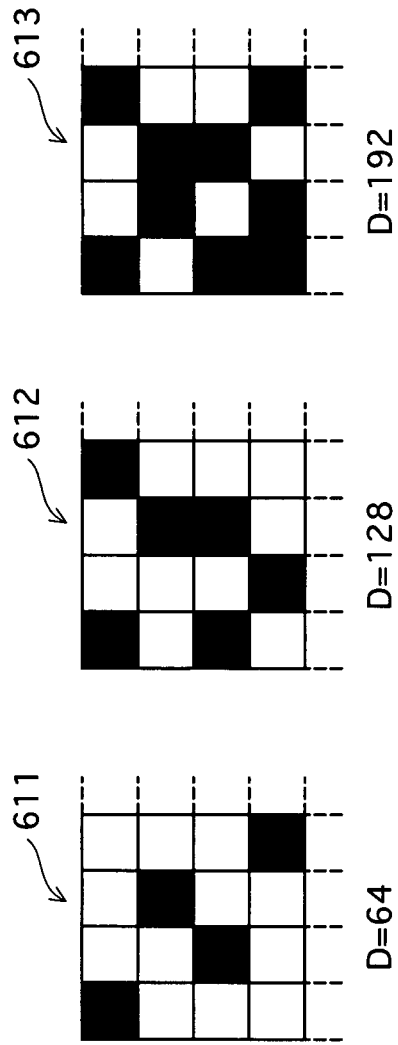
FIG. 4A shows an example of the grayscale reproduction by the dither method.

FIG. 4A shows an example of the grayscale reproduction by the dither method. In FIG. 4A, one box represents one pixel. Each portion of FIG. 4A shows 16 pixels out of 256 pixels, where black boxes represent pixels to be exposed.

For example, the $64^{th}$ grayscale level is represented by using a pattern 611 of the pixels to be exposed and not to be exposed is used. Also, the $128^{th}$ grayscale level is represented by using a pattern 612, and the $192^{nd}$ grayscale level is represented by using a pattern 613.

The non-edge grayscale reproducing unit 5341 converts, for each color, the grayscale data of all non-edge pixels into data indicating the amount of exposure. For example, the non-edge pixels to be exposed are converted into an exposure amount value "1", and the non-edge pixels not to be exposed are converted into an exposure amount value "0".

The edge grayscale reproducing unit 5342 converts, for each color, the grayscale data of edge pixels having been corrected by the γ correction into a format in which the data can be reproduced by the PWM (Pulse Width Modulation) control in one pixel cycle. More specifically, the edge grayscale reproducing unit 5342 modulates, for each edge pixel, the amount of exposure of an edge pixel. Hereinafter, the reproduction method by the PWM control in one pixel cycle is referred to as "1-dot PWM method".

Figure 4B:
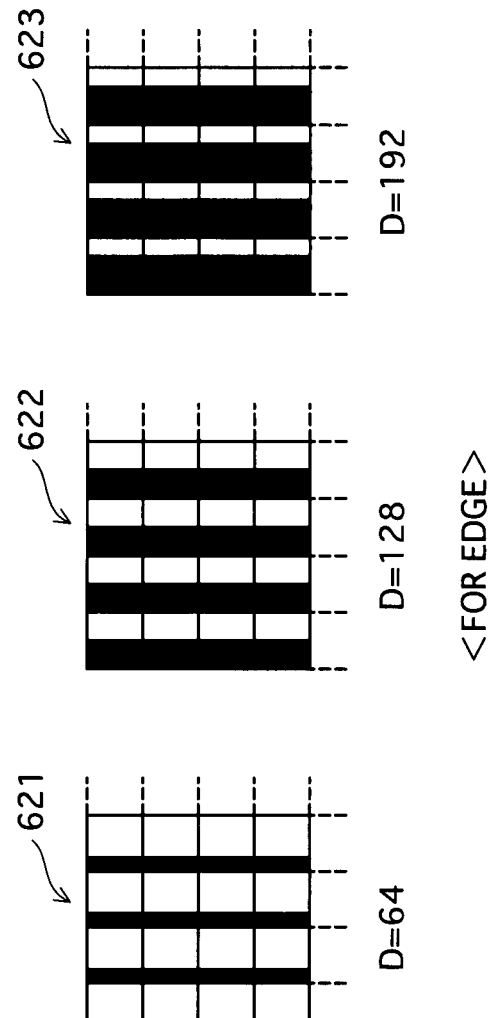
FIG. 4B shows an example of the grayscale reproduction by the 1-dot PWM method.

FIG. 4B shows an example of the grayscale reproduction by the 1-dot PWM method. As shown in FIG. 4B, the $64^{th}$ grayscale level is represented by using a pattern 621 in which the exposure time of each pixel is approximately ¼, the $128^{th}$ grayscale level is represented by using a pattern 622 in which the exposure time of each pixel is approximately ½, and the $192^{nd}$ grayscale level is represented by using a pattern 623 in which the exposure time of each pixel is approximately ¾.

The edge grayscale reproducing unit 5342 converts, for each color, the grayscale data of each edge pixel into data indicating the amount of exposure (for example, data indicating the exposure time) that corresponds to the grayscale level of each pixel.

After the grayscale data of each pixel is converted into data indicating the amount of exposure, the grayscale reproducing unit 534 sends converted data to the exposure control unit 54. The exposure control unit 54 controls, for each color, the amount of emitted light in the exposing unit 5 such that the photosensitive drum 3 is exposed by the amount of exposure as indicated by the data received from the grayscale reproducing unit 534.

With the above-described arrangements, in an image to be actually printed out, the non-edge portions have been corrected by the γ correction using the non-edge γ curves and are reproduced by the dither method, and the edge portions have been corrected by the γ correction using the edge γ curves and are reproduced by the 1-dot PWM method.

The pattern data storing unit 539 stores standard pattern data used for generating the γ curves.

Figure 5A:
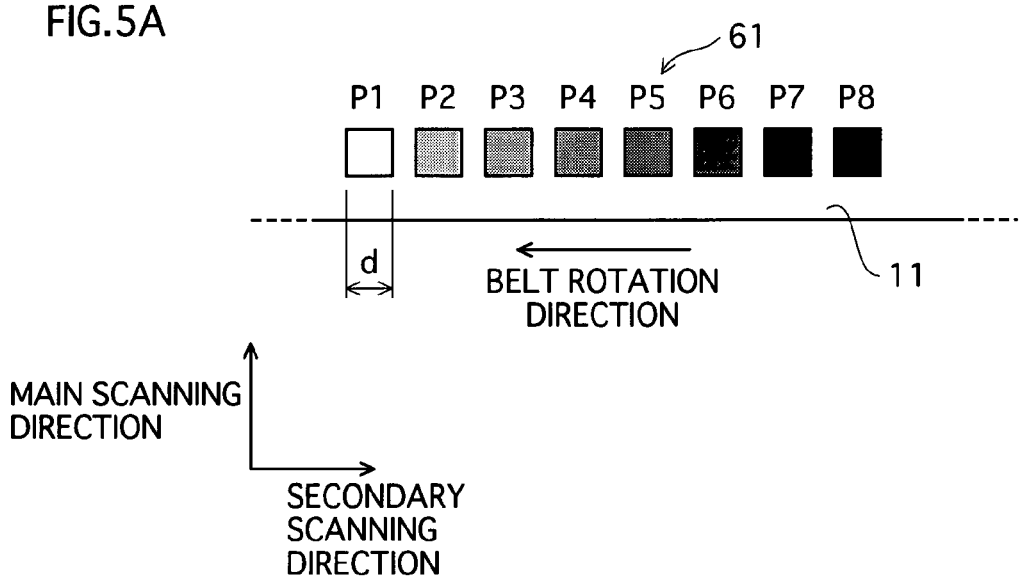
FIG. 5 shows the construction of the non-edge patterns.
Figure 6:
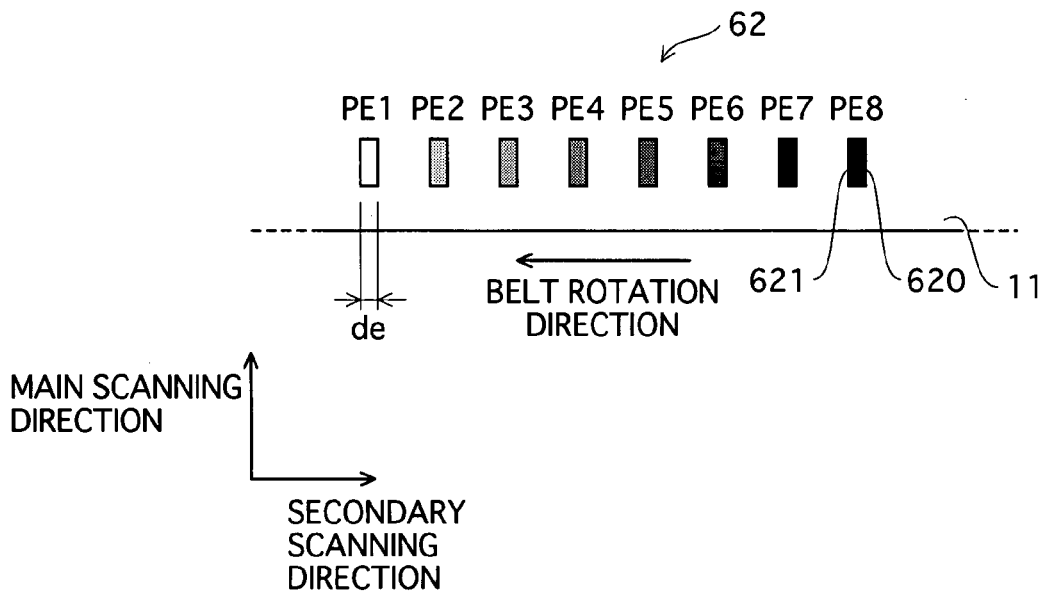
FIG. 6 shows the construction of the edge pattern.

In the present embodiment, the non-edge pattern 61, shown in FIG. 5A, used for generating the non-edge γ curves and the edge pattern 62, shown in FIG. 6, used for generating the edge γ curves are formed for each color as the standard patterns on the intermediate transfer belt 11 in sequence in the secondary scanning direction at predetermined intervals. The pattern data storing unit 539 preliminarily stores data indicating the grayscale levels of the patterns 61 and 62.

Here will be described an example in which the non-edge pattern 61 includes, as shown in FIG. 5A, the n number of patches (first patches) P1, P2, . . . , where n is integer 2 or more. FIG. 5A is a plan view of the intermediate transfer belt 11 when viewed from the direction indicated by the arrow C in FIG. 1, and shows an example in the case of n=8. The following describes the example in the case of n=8.

Each patch P is approximately 5 [mm] in width d in the secondary scanning direction, and has a different grayscale level. FIG. 5A shows an example in which the grayscale of the patches becomes gradually darker from P1 to P8. For example, in the case where 256 levels of grayscale are available, the grayscale levels may be set as: P1=32, P2=64, . . . P7=224, P8=256, for example.

Figure 5B:
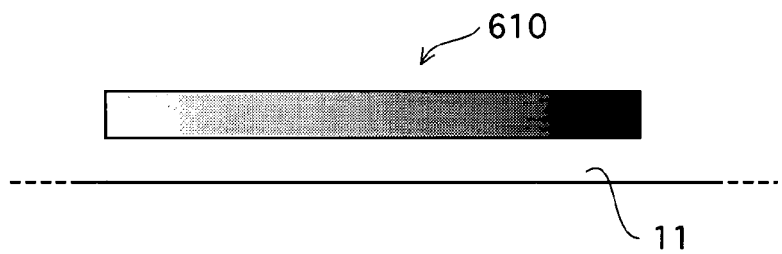

It should be noted here that a non-edge pattern 610, in which the grayscale changes seamlessly as shown in FIG. 5B, may be used.

The edge pattern 62 includes, as shown in FIG. 6, eight patches (second patches) PE1, PE2, . . . , PE8. FIG. 6 is a plan view of the intermediate transfer belt 11 when viewed from the direction indicated by the arrow C in FIG. 1.

A patch PEn of the edge pattern 62 is formed as an image having a smaller area than a patch Pn of the non-edge pattern 61.

Each patch PE is approximately 1 [mm] in width "de" in the secondary scanning direction, and has a different grayscale level. FIG. 6 shows an example in which the grayscale of the patches becomes gradually darker from PE1 to PE8. The grayscale levels may be set in the same manner as the non-edge pattern 61, or may set differently from the non-edge pattern 61.

The reason why each patch of the edge pattern 62 is elongated and has a small area as shown in FIG. 6 is as follows.

That is to say, when each patch is wide and has a large area, a phenomenon such as (a) an edge stressing effect, (b) an edge portion sweeping, or (c) an edge portion thinning may occur. These phenomena are apt to cause a difference in grayscale between an end and the center of a patch.

Here, (a) the edge stressing effect indicates a phenomenon in which for each patch, the density of an edge becomes relatively higher than the density of the center. The edge stressing effect occurs when the electric field is enhanced locally at an edge portion due to "going-around" of the electric force line, followed by a larger than normal amount of toner being attached to the edge portion during the developing process.

The (b) edge portion sweeping indicates a phenomenon in which for each patch, the density of an image back end (for example, an end 620 of patch PE8 shown in FIG. 6) becomes high and the density of the portions other than the image back end becomes low. This phenomenon occurs for the following reason for example. That is to say, when the photosensitive drum 3 and a developing roller 60 face each other (at the developing position), toner particles of a patch formed on the photosensitive drum 3 contact with toner particles on the developing roller 60 (see FIG. 1), and the toner particles in the central area of the patch move in the reverse direction of the photosensitive drum 3 rotation direction to stay at the back end of the patch in the secondary scanning direction.

The (c) edge portion thinning indicates a phenomenon in which for each patch, the density of an image front end (for example, an end 621 of patch PE8 shown in FIG. 6) becomes low. This phenomenon occurs when toner particles move from the front end of the patch in the secondary scanning direction to the central area of the patch where the amount of toner particles has been reduced due to the movement of the toner particles to the back end as described in (b) above. The level of influence on images of each of these phenomena varies depending on distance Ds between the photosensitive drum 3 and the developing roller 60, the electric field intensity, the amount of electrostatic charge and the like.

On the other hand, most lines in characters that are contained in the actual output images are several millimeters or less in width. In such narrow images, the above-described phenomena such as the edge stressing effect occur less than in wide images, and thus the difference in grayscale between the edge portions and the central area of an image is small.

As described above, the γ correction is performed so that the document image matches the output image in the grayscale. As a result, it is preferable that the γ curves that are used in the γ correction are generated from a result of density detection in which a standard pattern using a toner is formed as a test patch that is close to the actually output image. If so, the grayscale reproducibility is improved when the width of the patches used is as narrow as several millimeters or less, which is close to those of the actual characters. The width of the patch PEs may be determined from the size of the influence on the images by the above-described phenomena such as the edge stressing effect. This point will be described later.

Back to FIG. 3, the non-edge γ curve generating unit 535 generates the non-edge γ curves for each color in accordance with the results of detecting density of the non-edge pattern 61 formed on the intermediate transfer belt 11.

More specifically, when, for any color, the relationship between a grayscale level of an input image and a grayscale level of an actually output image (for example, a relationship represented by curve 70 shown in FIG. 7A) is deviated from an ideal relationship represented by the directly proportional line (dashed line) shown in FIG. 7A, receiving the influence of the change in the peripheral environment (temperature, humidity and the like) of the device, the developing characteristics, the transfer characteristics or the like, the curve 70 is corrected to be curve 72 so that the grayscale level of the input image (document image) matches the grayscale level of the actual output image, and the curve 72 is used as a non-edge γ curve. In this sense, the non-edge γ curve is referred to as the first correction condition for correcting the grayscale of the image portion of a non-edge area. The non-edge γ curve generating unit 535 functions as a means for setting the first correction condition.

The non-edge γ curve storing unit 536 stores, for each color, data of the generated non-edge γ curves.

On the other hand, the edge γ curve generating unit 537 generates edge γ curves for each color in accordance with the results of detecting density of the edge pattern 62 formed on the intermediate transfer belt 11. The generation method is the same as that for the non-edge pattern 61.

More specifically, when, for any color, the relationship between a grayscale level of an input image and a grayscale level of an actually output image (for example, a relationship represented by curve 71 shown in FIG. 7B) is deviated from an ideal relationship represented by the directly proportional line, the curve 71 is corrected to be curve 73, and the curve 73 is used as an edge γ curve. In this sense, the edge γ curve is referred to as the second correction condition for correcting the grayscale of the image portion of an edge area. The edge γ curve generating unit 537 functions as a means for setting the second correction condition.

The edge γ curve storing unit 538 stores, for each color, data of the generated edge γ curves.

Figure 8:
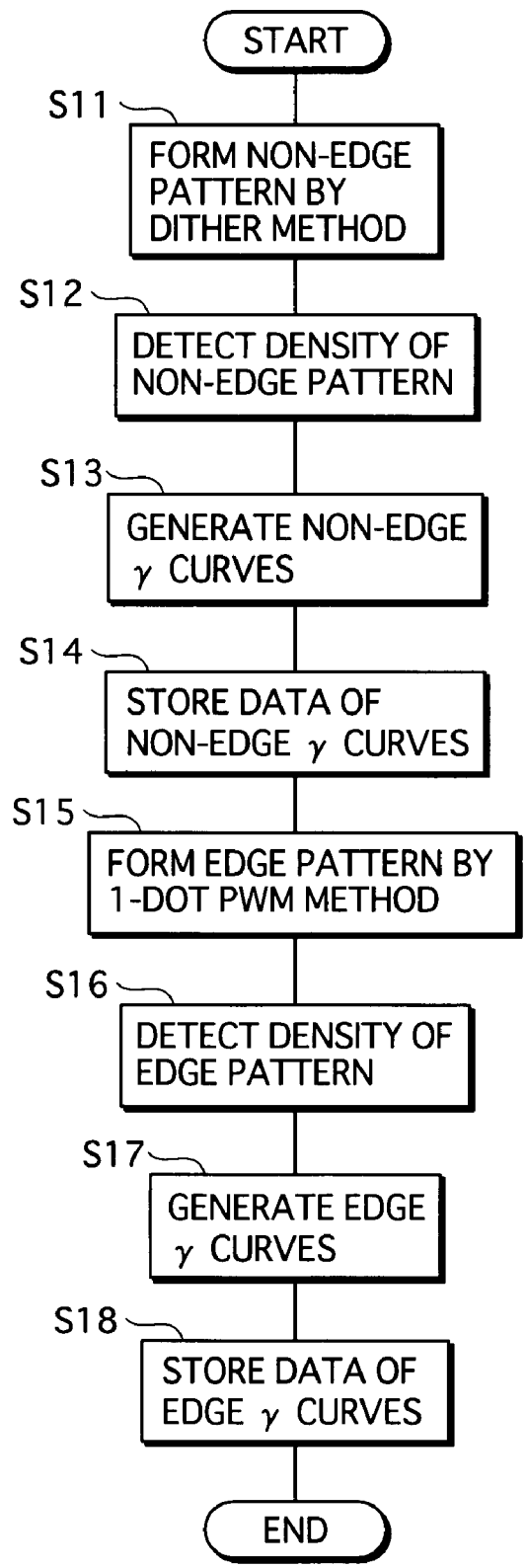
FIG. 8 is a flowchart showing the procedures of the γ curve generation process executed by the control unit.

FIG. 8 is a flowchart showing the procedures of the γ curve generation process executed by the control unit 50.

As shown in FIG. 8, the control unit 50 performs a control so that the non-edge pattern 61 is formed for each color on the intermediate transfer belt 11 using the dither method for reproducing the grayscale (step S11). More specifically, the non-edge grayscale reproducing unit 5341 reads out data of the non-edge pattern 61 from the pattern data storing unit 539, performs the grayscale reproduction process by the dither method (converts the read-out data into data that indicates the exposure amount based on the dither method), and sends the conversion result data to the exposure control unit 54 for each color.

The exposure control unit 54 performs the exposure based on the data, so that static latent images of the non-edge pattern 61 for each color are formed on the photosensitive drum 3. The formed static latent images are developed by a developing unit 6 using toners, and the toner images are transferred onto the intermediate transfer belt 11 as an initial transfer, resulting in the formation of the non-edge pattern 61 for each color on the intermediate transfer belt 11.

The density of the non-edge pattern 61 for each color is measured (step S12). Here, when the non-edge pattern 61 for each color passes under the toner pattern detecting sensor 15 as the intermediate transfer belt 11 rotates, a detection signal is detected by the toner pattern detecting sensor 15, and the detection signal is sent to the non-edge γ curve generating unit 535 as a density signal.

The non-edge γ curve generating unit 535 generates non-edge γ curves for each color from the received density signal (step S13). The generation method described earlier is also used here.

The control unit 50 performs a control so that data of the generated non-edge γ curves for each color is stored in the non-edge γ curve storing unit 536, updating the non-edge γ curves (step S14). The updated non-edge γ curves are read out by the non-edge γ correcting unit 5331 during an actual print output, and are used in the γ correction on the non-edge portions. It should be noted here that the non-edge pattern 61 formed on the intermediate transfer belt 11 is removed (cleaned) from the intermediate transfer belt 11 by a cleaner 16 (see FIG. 1). This also applies to the edge pattern 62 which will be described later.

Next, the edge pattern 62 for each color is formed on the intermediate transfer belt 11 using the 1-dot PWM method as the grayscale reproduction (step S15). More specifically, the edge grayscale reproducing unit 5342 reads out data of the edge pattern 62 from the pattern data storing unit 539, performs the grayscale reproduction process by the 1-dot PWM method (converts the read-out data into data that indicates the exposure amount based on the 1-dot PWM method), and sends the conversion result data to the exposure control unit 54 for each color in sequence.

The exposure control unit 54 performs the exposure based on the data, so that static latent images of the edge pattern 62 for each color are formed on the photosensitive drum 3. The formed static latent images are developed by the developing unit 6 using toners, and the toner images are transferred onto the intermediate transfer belt 11 as an initial transfer, resulting in the formation of the edge pattern 62 for each color on the intermediate transfer belt 11.

The density of the edge pattern 62 for each color is then measured (step S16). The method used here is the same as that for the non-edge pattern 61.

The edge γ curve generating unit 537 generates edge γ curves for each color from the detection signal received from the toner pattern detecting sensor 15 (step S17). The generation method described earlier is also used here.

The control unit 50 performs a control so that data of the generated edge γ curves for each color is stored in the edge γ curve storing unit 538, updating the edge γ curves (step S18). The process ends with this. The updated edge γ curves are read out by the edge γ correcting unit 5332 during an actual print output after this, and are used in the γ correction on the edge portions.

FIGS. 9A to 9D illustrate by comparison the difference between the method of the present embodiment and a conventional method in an example in which a document image, in which a high-density line (grayscale level D2) is drawn on a halftone (half-density: grayscale level D1) ground, is output. FIGS. 9A to 9D, the horizontal direction corresponds to the secondary scanning direction.

Figure 9A:
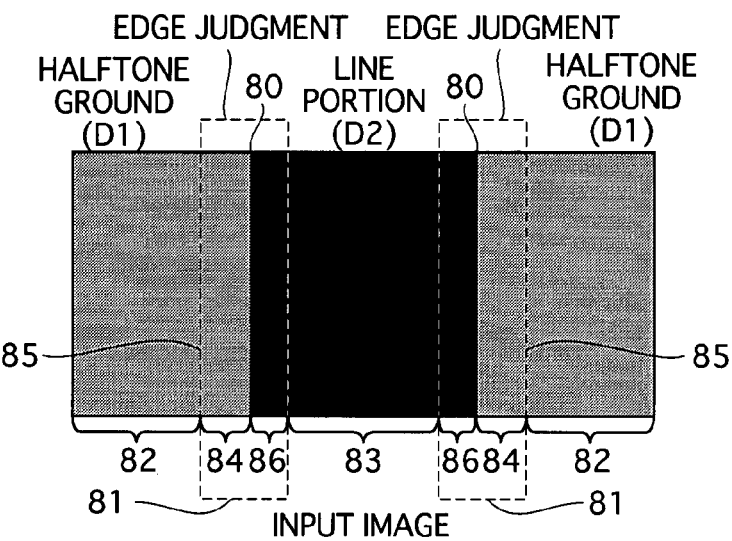
FIGS. 9A to 9D illustrate by comparison the difference between the method of the present embodiment and a conventional method in an example in which a document image, in which a high-density line is drawn on a halftone ground, is output.

FIG. 9A shows an example in which areas 81 encircled by dotted lines, which include each boundary 80 between the line and the halftone grounds, have been judged as edge portions, and the remaining areas have been judged as non-edge portions.

Figure 9B:
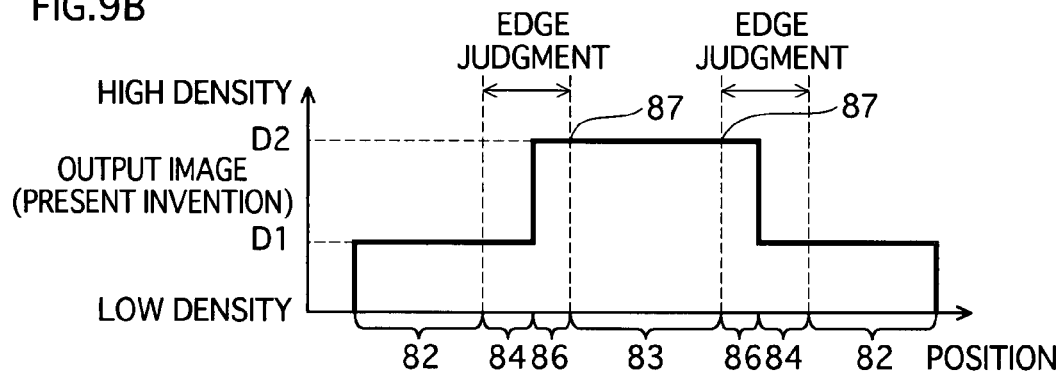

FIG. 9B shows an example of grayscale levels of an output image for a document image, output by the construction of the present embodiment. In FIG. 9B, the horizontal axis represents positions of the image shown in FIG. 9A in a horizontal direction (corresponding to the secondary scanning direction), and the vertical axis represents grayscale levels. In this case of the present embodiment, the document image and the output image are substantially equal to each other in the grayscale, which indicates that the grayscale reproducibility is excellent.

The reason why such an excellent grayscale reproducibility can be achieved is that the γ correction is performed using the γ curves respectively dedicated to the edge portions and non-edge portions. That is to say, in the present embodiment, as described above, the non-edge γ curve 72 is used in the γ correction for the non-edge portions.

For example, as shown in FIG. 7A, the grayscale level D1 of area 82, which has been judged as a non-edge portion of a halftone ground, is corrected to grayscale level D7.

The non-edge γ curve 72 for correction is generated on the presumption that an image with a density level corresponding to grayscale level D1 is printed out if the grayscale level of the non-edge portion on the halftone ground has been corrected from D1 to D7. Accordingly, if a print output is performed after correcting the grayscale level from D1 to D7, it is possible to make the density of the actual output image closer to the density corresponding to the grayscale level D1. This makes it possible to obtain an image that is very close to the input image, as shown by the example of the grayscale level of the output image shown in FIG. 9B.

Similarly, regarding the grayscale level D2 of the area 83 judged as a non-edge portion of a line portion, by converting the grayscale level from D2 to D8, it is possible to make the density of the actual output image closer to the density corresponding to the grayscale level D2.

On the other hand, the edge γ curve 73 is used in the γ correction of the edge portions.

For example, as shown in FIG. 7B, the grayscale level D1 of an area 84, which has been judged as an edge portion of a halftone ground, is corrected to grayscale level D7'.

The edge γ curve 73 for correction is generated on the presumption that an image with density corresponding to the grayscale level D1 is actually obtained if a print output is performed after correcting the grayscale level of the edge portion from D1 to D7'. Accordingly, if a print output is performed by correcting the grayscale level from D1 to D7', it is possible to make the density of the actual output image closer to the density corresponding to the grayscale level D1. This makes it possible to obtain an image that is very close to the input image, as shown by the example of the grayscale level of the output image shown in FIG. 9B.

With the construction described above, even if edges and non-edges are respectively reproduced by different reproduction methods, there is hardly a grayscale (density) difference between the area 82 of the halftone ground judged as a non-edge portion and the area 84 of the halftone ground judged as an edge portion. And the boundary 85 hardly becomes an offence to human eyes.

This also applies to the line portion. That is to say, the grayscale level D2 of an area 86, which is judged as an edge portion, is converted into grayscale level D8' using the edge γ curve 73. With this arrangement, the density of the actual output image becomes close to the density corresponding to the grayscale level D2.

Also, there is hardly a grayscale difference between the area 86 of the line portion judged as an edge portion and the area 83 of the line portion judged as a non-edge portion. And the boundary 87 hardly becomes an offence to human eyes.

Figure 9C:
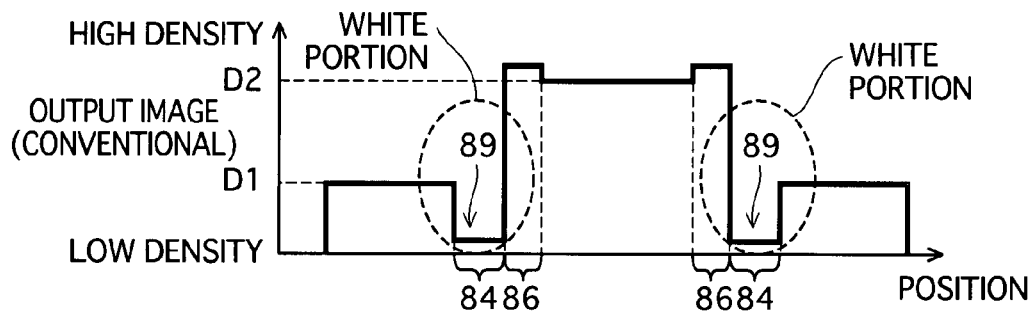
Figure 9D:
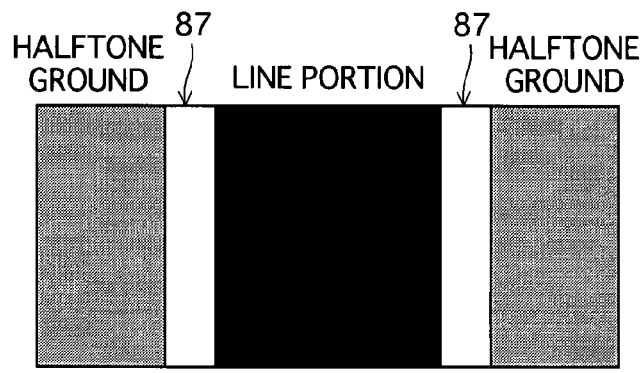

In contrast, when only one γ curve (for example, the curve 72) is used to correct both the edge portion and the non-edge portion (as in a conventional technology), the edge portion will have a degraded grayscale reproducibility as shown in FIGS. 9C and 9D although the grayscale levels of the areas 82 and 83 judged as non-edge portions will substantially be equal to those of the input image.

More specifically, the grayscale level D1 of the area 84 of the halftone ground judged as an edge portion is converted into grayscale level D7 using the non-edge γ curve 72 as shown in FIG. 7A. Here, the density corresponding to the grayscale level D7 is lower (thinner) than the density corresponding to the grayscale level D7' that is obtained by the conversion using the edge γ curve 73.

Accordingly, if the grayscale is corrected using only the non-edge γ curve 72, the grayscale level of the area 84 in an actual output image becomes far lower than an originally expected value of the grayscale level D1 in the output image, and in some cases, a white portion 89, which degrades the grayscale reproducibility, may be generated.

Also, in the conventional technology, the grayscale level D2 of the area 86 of the line portion judged as an edge portion is converted into grayscale level D8 using the non-edge γ curve 72. Here, the density corresponding to the grayscale level D8 is higher (thicker) than the density corresponding to the grayscale level D8' that is obtained by the conversion using the edge γ curve 73. Accordingly, the grayscale level of the area 85 in an actual output image becomes higher than an originally expected value of the grayscale level D2 in the output image, as shown in FIG. 9C, and it appears that in the line portion of in the image, there is a difference in height.

Figure 10A:
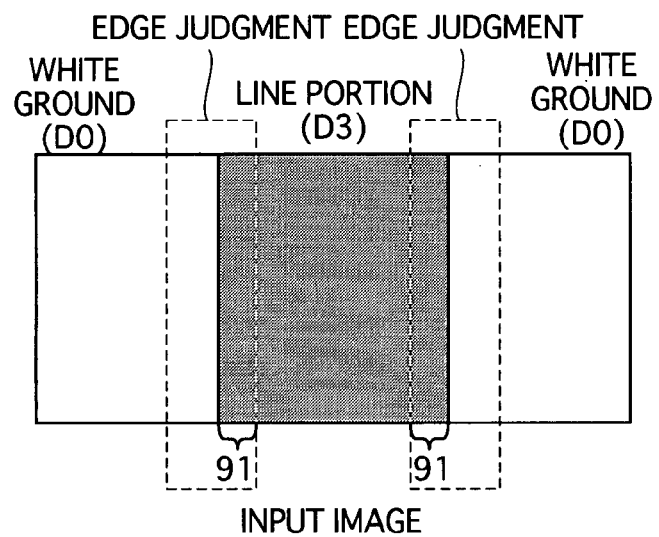
FIGS. 10A to 10D illustrate by comparison the difference between the method of the present embodiment and a conventional method in an example in which a document image, in which a halftone line is drawn on a white ground, is output.
Figure 10B:
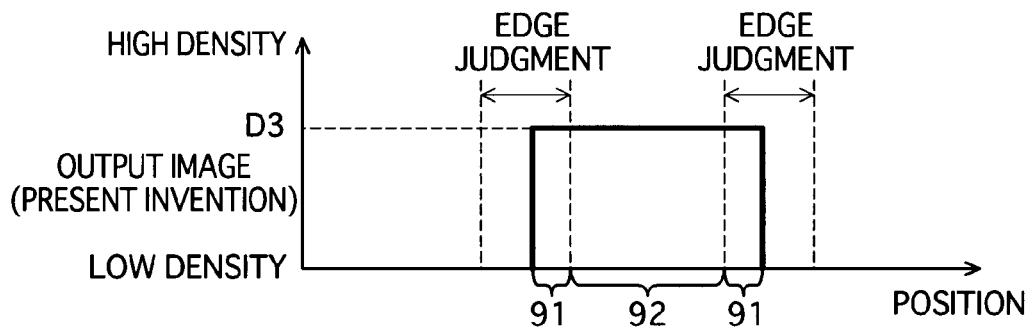

The above-described analysis also applies to other cases such as an example shown in FIG. 10A. FIG. 10A shows an example of a document image in which a line (line portion) of a halftone (grayscale level D3) is drawn on a white (white color) ground (grayscale level D0). FIG. 10B shows an example of an output image in the present embodiment.

In the present embodiment, the grayscale level D3 of area 91, which has been judged as an edge portion of a line portion, is converted to grayscale level D9' using the edge γ curve 73. This makes it possible to make the density of the actual output image close to the density corresponding to the grayscale level D3. Also, hardly occurs a grayscale difference between the area 91 judged as an edge portion of a line portion and an area 92 judged as a non-edge portion of the line portion.

Figure 10C:
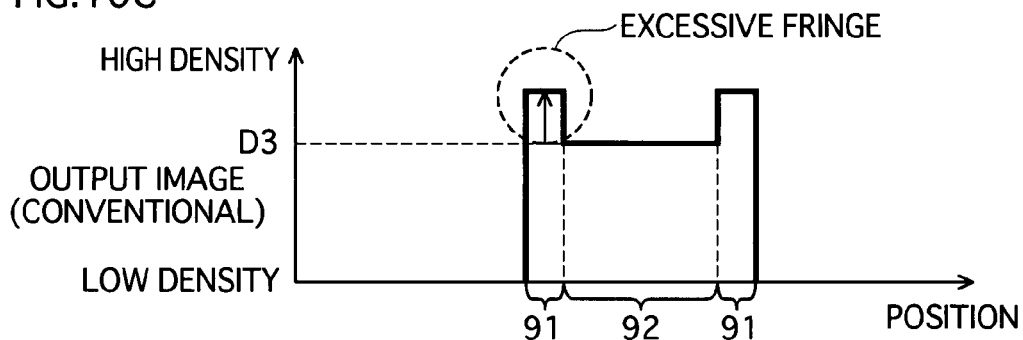
Figure 10D:
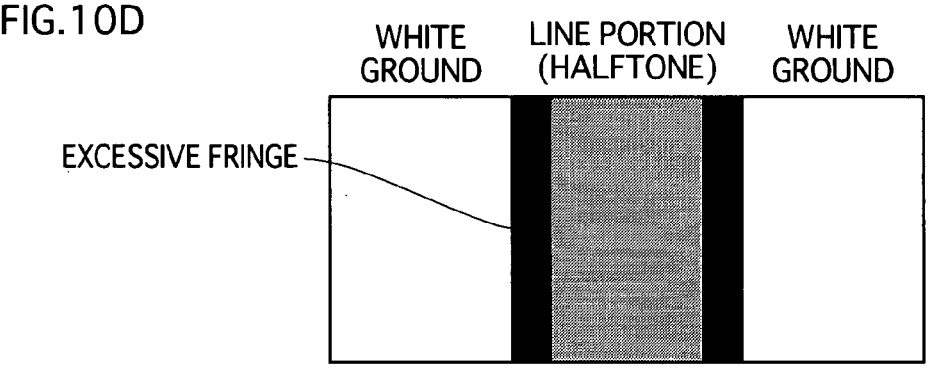

On the other hand, if the non-edge γ curve 72 is used as in a conventional technology, the grayscale reproducibility degrades as shown in FIGS. 10C and 10D. Namely, in the conventional technology, although the grayscale level D3 is converted into grayscale level D9 using the non-edge γ curve 72, the grayscale level D9 is higher than grayscale level D9'.

As a result, the density of the area 91 in the output image after the conversion using the non-edge γ curve 72 is higher than the density corresponding to an originally expected value of the grayscale level D3 in the output image, as shown in FIG. 10C. This makes it appear that an area 92 of a line portion is fringed, which degrades the grayscale reproducibility.

As described above, in the present embodiment: (a) the grayscale of an edge portion in an image is corrected using a γ curve for the correction, and the edge portion is reproduced by a grayscale reproduction method for the edge portion; (b) the grayscale of a non-edge portion in an image is corrected using a γ curve for the correction, and the non-edge portion is reproduced by a grayscale reproduction method for the non-edge portion; (c) the γ curve for the edge portion is generated based on the density of a standard pattern that was reproduced by the grayscale reproduction method for the edge portion; and (d) the γ curve for the non-edge portion is generated based on the density of a standard pattern that was reproduced by the grayscale reproduction method for the non-edge portion. With this construction of the present embodiment, the grayscale correction of the image is performed using γ curves that reflect the actual output characteristics of the edge portion and the non-edge portion. This makes it possible to obtain improved grayscale reproducibility of the output image, compared with conventional technologies.

Also, in the present embodiment, the width of each patch PE of the edge pattern 62 is set to be substantially equal to the line width (for example, 1 [mm]) of the characters contained in the actual output image. With this construction, even if the patch receives an influence of the edge stressing effect or the like, the level of the influence is substantially the same as the level of the influence that the characters in the actually output image would receive. That is to say, it is possible to generate γ curves that reflect the actual output characteristics of the character images. This makes it possible to obtain improved grayscale reproducibility of the characters.

As described above, the width "de" of each patch PE is determined by taking into account the level of influence of the edge stressing effect and the like. The results of the experiments or the like performed by the inventors of the present application show that the output image hardly receive influence of the edge stressing effect or the edge portion sweeping or the like (i) if the width of the patch PE is set to be smaller than distance Ds between the photosensitive drum 3 and the developing roller 60, or (ii) if the width of the patch PE is set to be smaller than the length of a developing area (developing NIP width) in the secondary scanning direction, where the developing area is an area in which toner particles can transfer between the photosensitive drum 3 and the developing roller 60 at the developing position during the developing process. This is because if the patch width is set to be larger than the developing NIP width, more amount of toner particles transfers in or from the edge portion having such a wide area.

The inventors of the present application also found that if the width of the patch is set to be more than 2 [mm], the image receives more influence of the edge stressing effect and the like. That is to say, a phenomenon such as a local difference in density, unevenness in the intermediate density area, or a noise occurs. It is understood from this that the patch width is preferably 2 [mm] or less. It is more preferable that the patch width is set to be in a range from 100 [μm] to 1 [mm] inclusive. This is because if the patch width is set to be smaller than 100 [μm], it is difficult for human eyes to perceive a difference in density included in the patch.

It is also preferable that the patch width is set to be smaller than the maximum width in the secondary scanning direction of the area judged to be an edge in an image (an area that can be reproduced by the 1-dot PWM method, and corresponds to the area 81 in the example shown in FIG. 9A). This is because if the patch width is set to be equal to or larger than the maximum width, it often appears to human eyes that the grayscale reproduction method for the non-edge portion provides better reproduction.

It is also preferable that the patch width of the edge pattern 62 is set to be smaller than patch width "d" of the non-edge pattern 61. This is because it is preferable that since the non-edge pattern 61 is used for correcting the grayscale of the halftone image, the patch width of the non-edge pattern is set to be larger than the patch width of the edge pattern to a certain extent (5 [mm] in the above-described example) such that the γ curve is generated by detecting the density of the central portion that does not receive the influence of the edge stressing effect and the like. The patch width "de" of the edge pattern 62 is determined so as to satisfy at least one of the above-described conditions.

In the above description, the toner pattern detecting sensor 15 is used to detect density of the non-edge pattern 61 and the edge pattern 62. However, not limited to this construction, detection sensors respectively dedicated to the non-edge pattern 61 and the edge pattern 62 may be provided, as one example.

More specifically, a detection sensor dedicated to the non-edge pattern 61 detects the density of the non-edge pattern 61 in terms of a density detection area on the intermediate transfer belt 11 that has a first width in the secondary scanning direction, and a detection sensor dedicated to the edge pattern 62 detects the density of the edge pattern 62 in terms of a density detection area on the intermediate transfer belt 11 that has a second width that is smaller than the first width. The reason for this construction is as follows. That is to say, since the width "de" of the patches PE of the edge pattern 62 is smaller than the width "d" of the patches P of the non-edge pattern 61, the detection sensor dedicated to the edge pattern 62 can detect with more accuracy the rising edge density of a patch with a smaller width when it performs the detection on the density detection area having a smaller width.

On the other hand, the detection sensor dedicated to the non-edge pattern 61 can remove the influence of noise and detect with more accuracy the pattern of the pixels to be exposed and not to be exposed reproduced by the dither method when it performs the detection on the density detection area having a larger width in the secondary scanning direction.

The number of the detection sensor is not limited to two in so far as the width of the density detection area can be changed according to the type of the toner pattern. For example, only one detection sensor may be used if the width (slit width) of a light-receiving opening (slit) of the detection sensor can be changed. In this case, the slit width may be, for example, 0.95 to 0.05 times the width "de" of the patches PE of the edge pattern 62.

This also applies to the case where the detection sensor dedicated to the edge pattern 62 is used.

Furthermore, as examples of constructions intended to improve the detection accuracy, the wavelength or amount of light transmitted from light-emitting elements of the detection sensor may be varied in accordance with the type of the toner pattern, or the light reception sensitivity may increased so that the density can be detected with more accuracy, discerning differences between more minute darkness levels.

Second Embodiment

In the First Embodiment, the non-edge pattern 61 and the edge pattern 62 are formed on the intermediate transfer belt 11 at shifted timings on the intermediate transfer belt 11. In the Second Embodiment, as shown in FIGS. 11A and 11B, the patches PE for the edge γ curve and the patches P for the non-edge γ curve are arranged in sequence, as a standard pattern 63 or 64 for example, such that respective patches of the patches PE and the patches P are alternately adjacent to each other, appearing to human eyes that the patches are overlapping with each other. This is the difference from the First Embodiment. In the following description of the Second Embodiment, explanation of the contents that have already been explained in the First Embodiment is omitted, with the same reference numbers given to constituents that are common to both embodiments.

The standard pattern 63 shown in FIG. 11A is composed of patches that are arranged in sequence in the secondary scanning direction such that respective patches of the patches PE and the patches P are alternately adjacent to each other: PE1, P1, PE2, P2, . . . PE8, P8. Here, it is presumed that the width "d" of the patches P and the width "de" of the patches PE are the same as those shown in FIGS. 5 and 6. This also applies to the other patterns that will be described later.

The patches PE1-PE8 have different grayscale levels, and the patches P1-P8 also have different grayscale levels. FIG. 11A shows an example in which the patches PE1-PE8 and P1-P8 having the same grayscale levels as those shown in FIGS. 5 and 6 are arranged.

In either sequence of the patches PE and patches P, the grayscale level becomes gradually higher from one end to the other end. From this, the standard pattern 63 is referred to as a pattern in which the two types of patches have grayscale levels that change in the same direction.

On the other hand, the standard pattern 64 shown in FIG. 11B is composed of patches that are arranged as: PE8, P1, PE7, P2, . . . P7, PE1, P8. Here, the patches PE1-PE8 and P1-P8 have the same grayscale levels as those of the standard pattern 63. In the sequence of the patches PE, the grayscale level becomes gradually lower from one end to the other end, and in the sequence of the patches P, the grayscale level becomes gradually higher from one end to the other end. From this, the standard pattern 64 is referred to as a pattern in which the two types of patches have grayscale levels that change in opposite directions.

Figure 12:
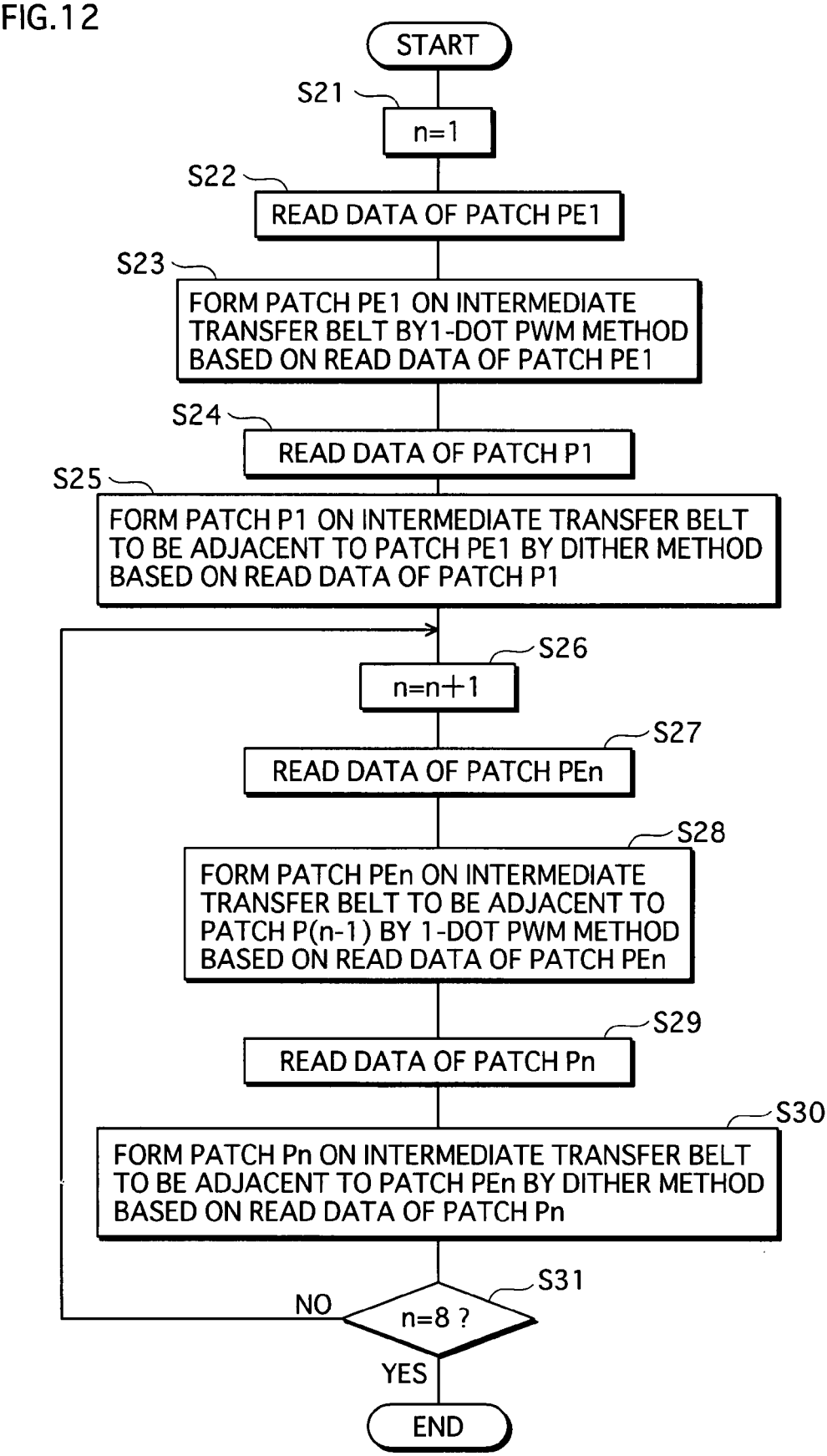
FIG. 12 is a flowchart showing the procedures of the process of forming the standard pattern performed by the control unit.

FIG. 12 is a flowchart showing the procedures of the process of forming the standard pattern 63 performed by the control unit 50.

As shown in FIG. 12, first the variable "n" is set to "1". The control unit 50 then reads data indicating the grayscale level of patch PE1 from the pattern data storing unit 539 (step S22).

The control unit 50 performs a control so as to form patch PE1 on the intermediate transfer belt 11 by the 1-dot. PWM method based on the read data indicating the grayscale level (step S23).

The control unit 50 then reads data indicating the grayscale level of patch P1 from the pattern data storing unit 539 (step S24). The control unit 50 performs a control so as to form patch P1 on the intermediate transfer belt 11 by the dither method based on the read data indicating the grayscale level (step S25). In this formation of patch P1, the formation timing is controlled so that patch P1 is formed to be adjacent to patch PE1 on the intermediate transfer belt 11 in the secondary scanning direction.

Next, the variable "n" is incremented by "1" (step S26). At this round of the example, the variable "n" becomes "2".

The control unit 50 then reads data indicating the grayscale level of patch PE2 from the pattern data storing unit 539 (step S27), and performs a control so as to form patch PE2 by the 1-dot PWM method so as to be adjacent to patch P1 on the intermediate transfer belt 11, in the secondary scanning direction (step S28).

The control unit 50 then reads data indicating the grayscale level of patch P2 (step S29). The control unit 50 performs a control so as to form patch P2 by the dither method based on the read data indicating the grayscale level, so as to be adjacent to patch PE2 on the intermediate transfer belt 11 in the secondary scanning direction (step S30).

Next, it is judged whether or not the variable "n" is "8" (step S31). If it is judged that the variable "n" is not "8" ("NO" in step S31), the control returns to step S26.

In step S26, the variable "n" is incremented by "1". At this round of the example, the variable "n" becomes "3". Then patch PE3 is formed in steps S27 and S28, and patch P3 is formed in steps S29 and S30, both on the intermediate transfer belt 11, in the same manners as described above, respectively.

The process of steps S26-S31 is repeatedly performed until it is judged that the variable "n" is "8" in step S31. This allows the remaining patches to be formed on the intermediate transfer belt 11 to be alternately adjacent to each other in the order of: PE4, P4, . . . PE8, P8. When it is judged that the variable "n" is "8" in step S31, the process of this flowchart ends.

The toner pattern detecting sensor 15 detects the density of the standard pattern 63 formed on the intermediate transfer belt 11. In this detection, the density of each patch is sampled in the order of: PE1, P1, PE2, P2, ... PE8, P8, at the timings that are set with reference to the timing of the patch PE1 in accordance with the forming intervals of each patch. The results of sampling the patches P1-P8 are sent to the non-edge γ curve generating unit 535, which then generates the non-edge γ curve based on the received samples. The results of sampling the patches PE1-PE8 are sent to the edge γ curve generating unit 537 so that the edge γ curve is generated.

The standard pattern 63 is formed in the above-described manner. The same method may be used to form the standard pattern 64.

Each of the standard patterns 63 and 64 is a combination of patterns for the non-edge γ curve and the edge γ curve. Accordingly, compared with the case in which the two types of patterns are formed separately, the use of the standard pattern 63 or 64 can reduce the total length of the standard pattern in the secondary scanning direction, and can reduce the time required for forming and detecting the standard pattern.

Furthermore, the use of the standard pattern 63 or 64 enables the γ curve to be generated in more compliance with the actual output characteristics.

That is to say, for example, in the standard pattern 64, patch PE6 is sandwiched between patches P2 and P3. Patches P2 and P3 are halftone images thinner than patch PE6. In such a case, if the image forming device receives an input image in which a character, which is as thick as the density level of PE6, is drawn on a halftone ground which is as thin as the density level of P2, it is possible to generate a γ curve that is in compliance with the output characteristics of an actual output image of the input image.

The difference in the density of the ground between white and a halftone creates a difference in the distribution of the electric force line in the edge portion of the characters in a static latent image formed on the photosensitive drum 3. This may further affect the influence of the edge stressing effect and the like on the image. As a result, when the standard pattern 64 as such is used, it is possible to generate the γ curve from a standard pattern that is in more compliance with the actual output characteristics in correspondence with an input image in which a character is drawn on a halftone ground.

Accordingly, by using the γ curve that is generated as described above, it is possible to obtain an output image whose grayscale is closer to the grayscale of the corresponding input image than that of the case in which the γ correction is performed using a γ curve that is generated from a pattern in which patch PE6 is formed on a white ground, resulting in more improvement in the grayscale reproducibility. This also applies to the other relationships between patches PE and P, such as the relationships between patches PE8 and P1, or the relationships between patches PE7 and P1.

The standard pattern to be formed may be determined depending on certain conditions. For example, the standard pattern 64 may be formed when the printer 1 is installed in an environment in which it often output images in which characters are drawn on a halftone ground, and otherwise, the standard pattern 63 may be formed. The switch between these standard patterns may be performed, for example, upon receiving an instruction from the user, or when the rate of the number of output images, in which characters are drawn on a ground, to the total number of output images exceeds a threshold value.

Figure 13A:
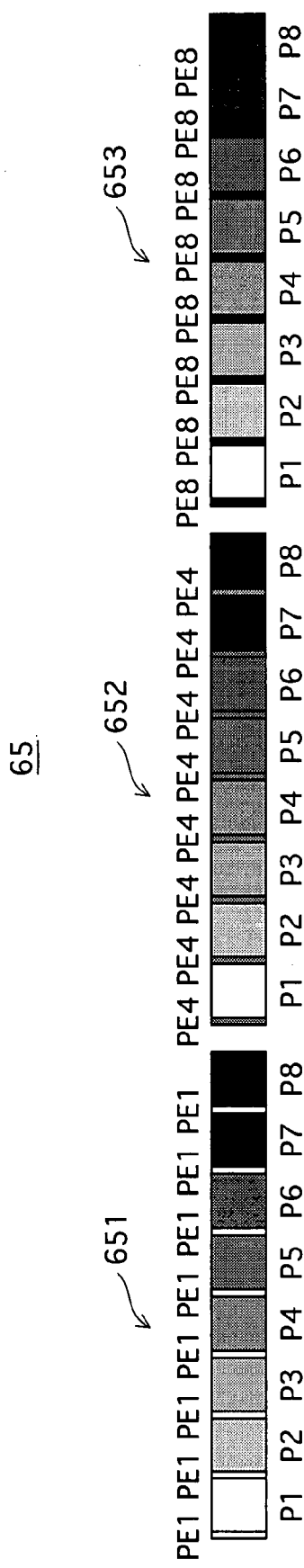
FIGS. 13A and 13B shows other examples of the standard pattern, standard patterns.
Figure 13B:
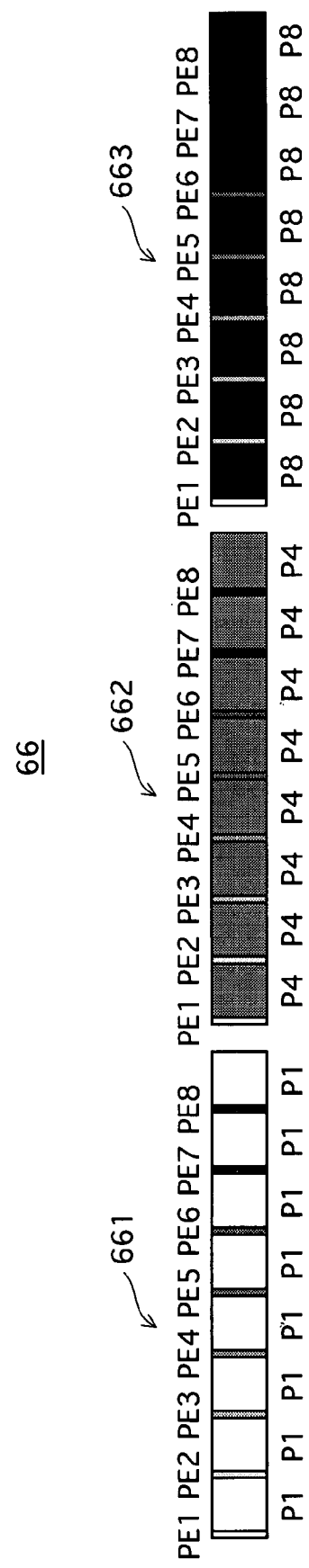

FIGS. 13A and 13B shows other examples of the standard pattern.

A standard pattern 65 shown in FIG. 13A is composed of three partial patterns 651, 652, and 653. The partial patterns 651, 652, and 653 are formed on the intermediate transfer belt 11 in sequence in the secondary scanning direction at regular intervals.

The partial pattern 651 is formed by forming the patches PE1 and patches P on the intermediate transfer belt 11 to be alternately adjacent to each other in the order of: PE1, P1, PE1, P2, ... PE1, P8. Here, all the patches PE1 have the same grayscale level, and the grayscale level of the patches P1-P8 becomes gradually higher from one end to the other end.

The partial pattern 652 is formed by forming the patches PE4 and patches P on the intermediate transfer belt 11 to be alternately adjacent to each other in the order of: PE4, P1, PE4, P2, ... PE4, P8. Here, all the patches PE4 have the same grayscale level that is higher (higher in density) than the patch PE1, and the grayscale level of the patches P1-P8 becomes gradually higher from one end to the other end, as is the case with the partial pattern 651.

The partial pattern 653 is formed by forming the patches PE8 and patches P on the intermediate transfer belt 11 to be alternately adjacent to each other in the order of: PE8, P1, PE8, P2, ... PE8, P8. Here, all the patches PE8 have the same grayscale level that is higher than the patch PE4, and the grayscale level of the patches P1-P8 becomes gradually higher from one end to the other end, as is the case with the partial pattern 651.

With the above-described construction, it is possible to further improve the grayscale reproducibility.

More specifically, the partial patterns 651, 652, and 653 include the same set of patches P1-P8, with grayscale level of the patch PE being "low" in the partial pattern 651, "middle" in the partial pattern 652, and "high" in the partial pattern 653.

Here, suppose, for example, that the printer 1 is expected to receive input images which may include any of three types of characters: (1) characters having a low density level; (2) characters having a middle density level; and (3) characters having a high density level, which are all drawn on a halftone ground. In such a case, by forming the partial patterns 651, 652, and 653 as the patterns for respectively generating the edge γ curves for improving the grayscale reproducibility of the low-grayscale-level, middle-grayscale-level, and high-grayscale-level characters, generating the edge γ curves respectively from the formed three types of partial patterns, and when outputting an image in correspondence with an input image in which a character having a low grayscale level corresponding to the patch PE1 is drawn on a halftone ground, by performing the γ correction on the edge portions of the image using the edge γ curve generated from the partial pattern 651, it is possible to perform the γ correction that is in compliance with the actual output characteristics, further improving the grayscale reproducibility.

Similarly, it is possible to improve the grayscale reproducibility by performing the γ correction on the edge portions of the image using the edge γ curve generated from the partial pattern 652 when outputting an image in correspondence with an input image in which a character having a middle grayscale level corresponding to the patch PE4 is drawn, and by performing the γ correction on the edge portions of the image using the edge γ curve generated from the partial pattern 653 when outputting an image in correspondence with an input image in which a character having a high grayscale level corresponding to the patch PE8 is drawn.

The above description also applies to a standard pattern 66 shown in FIG. 13B.

The standard pattern 66 shown in FIG. 13B is composed of three partial patterns 661, 662, and 663.

The partial pattern 661 is formed by forming the patches PE and patches P1 on the intermediate transfer belt 11 to be alternately adjacent to each other in the order of: PE1, P1, PE2, P1, ... PE8, P1. Here, all the patches P1 have the same grayscale level, and the grayscale level of the patches PE1-PE8 becomes gradually higher from one end to the other end. That is to say, the partial pattern 661, compared to the partial pattern 651, has a reversed relationship between the patches P and the patches PE. This applies to the other partial patterns 662 and 663.

The partial pattern 662 is formed by forming the patches PE and patches P4 on the intermediate transfer belt 11 to be alternately adjacent to each other in the order of: PE1, P4, PE2, P4, ... PE8, P4. Here, all the patches P4 have the same grayscale level that is higher than the patch P1, and the grayscale level of the patches PE1-PE8 becomes gradually higher from one end to the other end, as is the case with the partial pattern 661.

The partial pattern 663 is formed by forming the patches PE and patches P8 on the intermediate transfer belt 11 to be alternately adjacent to each other in the order of: PE1, P8, PE2, P8, ... PE8, P8. Here, all the patches P8 have the same grayscale level that is higher than the patch P4, and the grayscale level of the patches PE1-PE8 becomes gradually higher from one end to the other end, as is the case with the partial pattern 661.

In each of the partial patterns 661-663 constituting the standard pattern 66, the patches corresponding to the halftone ground have the same grayscale level, and the patches PE1-PE8 that correspond to the characters have different grayscale levels. With this construction, by generating the non-edge and edge γ curves depending on the density of the formed partial patterns 661-663, it is possible to obtain an output image whose grayscale of the characters and background is closer to the grayscale of the corresponding input image. For example, in the case of an input image in which a plurality of character sequences having different grayscale levels are drawn on a background having a grayscale level corresponding to the patch P4, the above-object advantage is obtained by performing the γ correction on the edge portions using the edge γ curve generated based on the density of the partial pattern 662, and by performing the γ correction on the non-edge portions using the non-edge γ curve generated based on the density of the partial pattern 662.

Also, in the case of an input image with a background having a grayscale level corresponding to the patch P8 (or P1), the same advantageous effect is obtained by performing the γ correction on the edge and non-edge portions using the edge and non-edge γ curves generated based on the density of the partial patterns 663 and 661, respectively.

As understood from the above description, from the viewpoint of improving the grayscale reproducibility, it is preferable to increase the number of combinations of grayscale levels of the adjacent patches P and PE in the standard patterns. However, the more the number of combinations is, the more the number of patches constituting the standard patterns. The increase in the number of patches of the standard patterns leads to the increase in the time required for detecting the patches, or the increase in the amount of toner consumption required for forming the patches. As a result, the optimum number of patches to be formed and the like are predetermined from experiments or the like, by taking into account the grayscale reproducibility and the amount of toner consumption and the like.

The present invention is not limited to an image forming device, but may be an image forming method including the above-described formation of the standard patterns and the like. The present invention may also be a program that causes a computer to perform the method. The program of the present invention may be recorded on various computer-readable recording mediums such as: magnetic tape; a magnetic disk such as a flexible disk; an optical recording medium such as DVD-ROM, DVD-RAM, CD-ROM, CD-R, MO, or PD; and a flash-memory-type recording medium. The present invention may be produced or transferred in the form of the above-mentioned recording medium, or may be sent or supplied in the form of the above-mentioned program via: one of various wired/wireless networks including the Internet; a broadcast; an electric communication line; a satellite communication or the like.

It is not necessary for the program of the present invention to include all the modules for the above-described processes to be executed by the computer. For example, part of the processes of the present invention to be executed by the computer may be achieved by general-purpose programs that can be installed in an information processing device, such as the programs contained in a communication program or an operating system (OS). Accordingly, the recording medium of the present invention does not necessarily record all the above-mentioned modules, nor is it necessary to send all the modules. Furthermore, predetermined processes of the present invention may be executed using dedicated hardware.

Modifications

Up to now, one aspect of the present invention has been described specifically through embodiments. However, the present invention is not limited to the above-described embodiments, but may be modified variously as the following shows.

(1) In the above-described embodiments, different grayscale reproduction methods are used respectively for the image at an edge portion (first attribute) and the image at a non-edge portion (second attribute), respectively. However, the first and second attributes are not limited to these. For example, a photograph may be regarded as an image having the first attribute, and a graph or figure may be regarded as an image having the second attribute. In the case of a photograph, the reproduction of the halftone may be weighed heavily by using the 2-pixel-cycle PWM control method, and in the case of a graph or the like, the reproduction of the non-edge portions may be weighed heavily by using the dither method.

When this construction is adopted: a standard pattern composed of a plurality of different grayscale levels is formed using the 2-pixel-cycle PWM control method (as a standard pattern for setting correction conditions), and a γ curve (first correction condition) for correcting the grayscale of the photograph image is generated from the results of the density of the formed standard pattern; and a standard pattern composed of a plurality of different grayscale levels is formed using the dither method (as a standard pattern for setting correction conditions), and another γ curve (second correction condition) for correcting the grayscale of the graph image or the like is generated from the results of the density of the formed standard pattern. The optimum size, number, and grayscale levels of the patches constituting each standard pattern are predetermined from experiments or the like.

In the above-described embodiments, the curve is used as the correction condition. However, not limited to this, any data may be used as the correction condition in so far as the data can be used for the grayscale correction. For example, data in a correction table may be used as the correction condition.

(2) The grayscale reproduction methods are not limited to those described above. For example, the grayscale of the non-edge portions may be reproduced by the 2-pixel-cycle PWM control method, which is described in "BACKGROUND OF THE INVENTION" of the present document, or the error diffusion method, in place of the dither method. It is also possible to use the screen process method in which the grayscale is reproduced by changing the number of screen lines (density of arranged dots).

Further, it is possible to use only the dither method. In this case, a dither matrix having the first coefficient is used for an image having the first attribute, and a dither matrix having the second coefficient, which is different from the first coefficient, is used for an image having the second attribute. It is further possible to use only the error diffusion method, in the same manner. In this case, error diffusion matrixes having different coefficients are used for images having different attributes, respectively. Also, in the case where the screen process method is used, the number of screen lines is changed depending on the attribute.

(3) With respect to the standard pattern, the size and the number of patches to be formed, the interval between adjacent patches and the like are not limited to those described above.

(4) In the above-described embodiments, the image forming device is applied to a tandem-type digital color printer. However, not limited to this, the image forming device of the present invention can be applied to, for example, a copier, a fax machine, or an MFP (Multiple Function Peripheral) in so far as it is an image forming device that, regardless of whether the image to be formed is color or monochrome, forms an image on an image carrier such as a photosensitive drum or an intermediate transfer member using different grayscale reproduction methods for each attribute of images, forms standard patterns using the different grayscale reproduction methods, and from detection results of the density of the formed standard patterns, sets correction conditions for correcting the grayscale of the images with different attributes, respectively in correspondence with the grayscale reproduction methods.

The above-described embodiments and modifications may be combined freely.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming device for forming an image on an image carrier using a different grayscale reproduction method for each of two or more different attributes contained in portions of the image, the image forming device comprising:
    a standard pattern forming unit operable to form a different standard pattern on an image carrier in one-to-one correspondence with each different attribute contained in the image portions, wherein the different patterns are each formed using a different grayscale reproduction method used for reproducing image portions containing the attribute;
    a detecting unit comprising a sensor operable to detect density of each standard pattern formed by the standard pattern forming unit;
    a correction condition setting unit operable to set, for each different attribute, a condition for correcting grayscale of the image portions containing the attribute, in accordance with the density detected by the detecting unit; and
    a grayscale correcting unit comprising a processor operable to correct grayscale of the image portions on the image carrier in accordance with each condition set by the correction condition setting unit.

2. The image forming device of claim 1, wherein
attributes contained in the image portions include an edge and a non-edge, and
the standard pattern forming unit forms, as a standard pattern, an edge pattern in accordance with a grayscale reproduction method that is used for reproducing edge portions of the image, and forms, as a standard pattern, a non-edge pattern in accordance with a grayscale reproduction method that is used for reproducing non-edge portions of the image.

3. The image forming device of claim 2, wherein
the non-edge pattern includes a plurality of first patches, the plurality of first patches have different grayscale levels and each first patch has a first area size, the edge pattern includes a plurality of second patches, and
the plurality of second patches have different grayscale levels and each second patch has a second area size that is smaller than the first area size.

4. The image forming device of claim 3, wherein
the standard pattern forming unit forms the first patches and the second patches on the image carrier to be arranged in sequence such that respective patches of the first patches and the second patches are alternately adjacent to each other.

5. The image forming device of claim 4, wherein
the standard pattern forming unit forms the first patches and the second patches such that in a direction in which the first patches and the second patches are arranged, grayscale of patches in each sequence of the first patches and the second patches becomes gradually higher from one end to another end of the sequence.

6. The image forming device of claim 4, wherein
the standard pattern forming unit forms the first patches and the second patches such that in a direction in which the first patches and the second patches are arranged, grayscale of patches in a sequence of the first patches becomes gradually higher from one end to another end of the sequence, grayscale of patches in a sequence of the second patches becomes gradually lower from one end to another end of the sequence.

7. The image forming device of claim 4, wherein
the standard pattern forming unit forms the first patches and the second patches such that all of the first patches have a same grayscale level, and in a direction in which the first patches and the second patches are arranged, grayscale of patches in a sequence of the second patches becomes gradually higher from one end to another end of the sequence.

8. The image forming device of claim 4, wherein
the standard pattern forming unit forms the first patches and the second patches such that all of the second patches have a same grayscale level, and in a direction in which the first patches and the second patches are arranged, grayscale of patches in a sequence of the first patches becomes gradually higher from one end to another end of the sequence.

9. The image forming device of claim 3 further comprising a developing unit operable to develop a static latent image formed on the image carrier, and a width "de" of the second patches in a secondary scanning direction is either smaller than a distance "Ds" between the image carrier and the developing unit or smaller than a length of a developing area in the secondary scanning direction, wherein the developing area is an area in which during a developing process a developing agent can transfer between the image carrier and the developing unit at a developing position where the image carrier and the developing unit face each other.

10. The image forming device of claim 3, wherein the width "de" of the second patches in the secondary scanning direction is smaller than 2 [mm].

11. The image forming device of claim 3, wherein the width "de" of the second patches in the secondary scanning direction is smaller than a width "d" of the first patches in the secondary scanning direction.

12. The image forming device of claim 3, wherein the width "de" of the second patches in the secondary scanning direction is smaller than a maximum width in the secondary scanning direction of an image area that is reproduced by the grayscale reproduction method used for reproducing the edge portions.

13. An image forming method for an image forming device that forms an image on an image carrier using a different grayscale reproduction method for each of two or more different attributes contained in portions of the image, the image forming method comprising:

a standard pattern forming step for forming a different standard pattern on an image carrier in one-to-one correspondence with each different attribute contained in the image portions, wherein the different patterns are each formed using a different grayscale reproduction method used for reproducing image portions containing the attribute;

a detecting step for detecting density of each standard pattern formed in the standard pattern forming step;

a correction condition setting step for setting, for each different attribute, a condition for correcting grayscale of the image portions containing the attribute, in accordance with the density detected in the detecting step; and a grayscale correcting step performed utilizing a processor for correcting grayscale of the image portions on an image carrier in accordance with each condition set in the correction condition setting step.

* * * * *